United States Patent
Yamaguchi et al.

(10) Patent No.: US 9,741,371 B2
(45) Date of Patent: Aug. 22, 2017

(54) MAGNETIC HEAD FOR PERPENDICULAR MAGNETIC RECORDING INCLUDING A WRITE SHIELD

(71) Applicant: TDK CORPORATION, Tokyo (JP)

(72) Inventors: Atsushi Yamaguchi, Tokyo (JP); Michitaka Nishiyama, Tokyo (JP); Kei Hirata, Tokyo (JP); Kenkichi Anagawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 192 days.

(21) Appl. No.: 14/667,081

(22) Filed: Mar. 24, 2015

(65) Prior Publication Data

US 2016/0284366 A1 Sep. 29, 2016

(51) Int. Cl.
*G11B 5/187* (2006.01)
*G11B 5/23* (2006.01)
*G11B 5/31* (2006.01)
*G11B 5/127* (2006.01)
*G11B 5/17* (2006.01)

(52) U.S. Cl.
CPC .......... *G11B 5/3116* (2013.01); *G11B 5/1278* (2013.01); *G11B 5/187* (2013.01); *G11B 5/23* (2013.01); *G11B 5/232* (2013.01); *G11B 5/315* (2013.01); *G11B 5/17* (2013.01)

(58) Field of Classification Search
CPC .......... G11B 5/17; G11B 5/187; G11B 5/1278
USPC ............ 360/119.02, 123.02, 123.08, 123.09, 360/123.25, 125.02, 125.13, 125.14, 360/125.15
See application file for complete search history.

(56) References Cited

U.S. PATENT DOCUMENTS

| 8,259,413 B2 * | 9/2012 | Bonhote | G11B 5/1278 29/603.01 |
|---|---|---|---|
| 8,289,649 B2 * | 10/2012 | Sasaki | G11B 5/1278 29/603.07 |
| 8,400,731 B1 * | 3/2013 | Li | G11B 5/3116 360/119.04 |
| 8,472,137 B2 | 6/2013 | Hirata et al. | |
| 8,699,183 B2 * | 4/2014 | Sahoo | G11B 5/1278 360/125.03 |
| 2011/0262774 A1 | 10/2011 | Pentek et al. | |
| 2012/0147499 A1 * | 6/2012 | Sasaki | G11B 5/3116 360/119.01 |
| 2013/0242431 A1 | 9/2013 | Hosomi et al. | |

* cited by examiner

*Primary Examiner* — Carlos E Garcia
(74) *Attorney, Agent, or Firm* — Oliff PLC

(57) ABSTRACT

A magnetic head includes a main pole, a write shield and a gap section. The write shield includes a trailing shield, a leading shield and two side shields. The gap section includes a trailing gap section, a leading gap section and two side gap sections. Each of the two side gap sections and the leading gap section increases in thickness with increasing distance from a medium facing surface. In the medium facing surface, the thickness of the leading gap section is greater than the width of each of the two side gap sections, and the width of each of the two side gap sections decreases with decreasing distance to the leading gap section.

6 Claims, 13 Drawing Sheets

MAGNETIC HEAD FOR PERPENDICULAR MAGNETIC RECORDING INCLUDING A WRITE SHIELD

BACKGROUND OF THE INVENTION

1. Field of the Invention

The present invention relates to a magnetic head for perpendicular magnetic recording for use to write data on a recording medium by means of a perpendicular magnetic recording system, and more specifically, to a magnetic head for perpendicular magnetic recording that includes a write shield.

2. Description of Related Art

The recording systems of magnetic recording devices such as magnetic disk drives include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole for producing a write magnetic field in a direction perpendicular to the plane of the recording medium.

A magnetic head for use in a magnetic disk drive is typically incorporated in a slider. The slider has a medium facing surface configured to face a recording medium. A main pole has an end face located in the medium facing surface. The medium facing surface has an air inflow end (a leading end) and an air outflow end (a trailing end). The slider is configured to slightly fly over the surface of the recording medium by means of an airflow that comes from the leading end into the space between the medium facing surface and the recording medium. The recording medium includes a magnetic recording layer. Tracks are concentrically formed in the magnetic recording layer. The tracks are the area of the magnetic recording layer on which data is to be written.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, there may occur the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). Unwanted erasure is noticeably encountered upon occurrence of a skew. For enhancement of recording density, it is necessary to prevent unwanted erasure.

A known technique for preventing unwanted erasure induced by a skew is to shape the main pole such that its end face located in the medium facing surface has a width that decreases with decreasing distance to the top surface of the substrate. Further, a known technique for preventing the skew-induced unwanted erasure and enhancing the recording density is to provide a wrap-around shield and a gap section, the wrap-around shield being a write shield having an end face that is located in the medium facing surface and surrounds the end face of the main pole, the gap section separating the wrap-around shield from the main pole. These techniques are disclosed in, for example, U.S. Pat. Nos. 8,289,649 B2 and 8,472,137 B2, and U.S. Patent Application Publication Nos. 2012/0147499 A1 and 2013/0242431 A1.

The wrap-around shield includes a leading shield, first and second side shields, and a trailing shield. The leading shield has an end face located in the medium facing surface at a position on the leading side of the end face of the main pole. The first and second side shields have two end faces located in the medium facing surface at positions on opposite sides of the end face of the main pole in the track width direction. The trailing shield has an end face located in the medium facing surface at a position on the trailing side of the end face of the main pole.

The gap section includes a leading gap section for separating the leading shield from the main pole, first and second side gap sections for separating the first and second side shields from the main pole, and a trailing gap section for separating the trailing shield from the main pole.

The wrap-around shield has the function of capturing a magnetic flux that is produced from the end face of the main pole and spreads in directions other than the direction perpendicular to the plane of the recording medium, and thereby preventing the magnetic flux from reaching the recording medium. A magnetic head provided with the wrap-around shield is able to prevent unwanted erasure and provide further enhanced recording density.

The position of an end of a record bit to be recorded on the recording medium is determined by the position of the trailing-side edge (hereinafter referred to as the top edge) of the end face of the main pole in the medium facing surface. Accordingly, what are important for enhancing the writing capability of the write head unit include: high write magnetic field strength at the top edge or in the vicinity thereof; and a large gradient of change in the write magnetic field strength at the top edge or in the vicinity thereof in the distribution of the write magnetic field strength in the direction in which the tracks extend. High write magnetic field strength at the top edge or in the vicinity thereof contributes to the enhancement of overwrite property. A large gradient of change in the write magnetic field strength at the top edge or in the vicinity thereof contributes to the reduction of bit error rate.

A magnetic head provided with a wrap-around shield suffers from the problem that when a large amount of magnetic flux leaks from the main pole to the wrap-around shield, particularly to the leading shield and the first and second side shields, there occurs reductions in the write magnetic field strength and the aforementioned gradient of change at the top edge of the end face of the main pole or in the vicinity of the top edge, and the writing capability is thereby degraded.

U.S. Patent Application Publication No. 2011/0262774 A1 discloses a magnetic head including a main pole, first and second side shields, a trailing shield, first and second side gap sections, and a trailing gap section. In this magnetic head, each of the first and second side gap sections includes a portion that increases in thickness with increasing distance from the medium facing surface. However, this magnetic head includes no leading shield and no leading gap section. This magnetic head is thus unable to suppress, on the leading side of the end face of the main pole, the spread of the magnetic flux produced from the end face of the main pole.

U.S. Patent Application Publication No. 2012/0147499 A1 discloses a structure in which the leading gap section has a greater thickness in the medium facing surface than each of the first and second side gap sections. However, it is difficult with this structure alone to suppress leakage of magnetic flux from the main pole to the leading shield and the first and second side shields.

U.S. Patent Application Publication No. 2013/0242431 A1 discloses a structure in which the leading gap section has a greater thickness in the medium facing surface than each of the first and second side gap sections and the thickness of each of the first and second side gap sections increases with decreasing distance to the leading shield, and further discloses a structure in which the thickness of the leading gap section decreases with increasing distance from the medium facing surface. Such a structure, however, is prone to leakage of magnetic flux from the main pole to the leading shield at a location away from the medium facing surface.

OBJECT AND SUMMARY OF THE INVENTION

It is an object of the present invention to provide a magnetic head for perpendicular magnetic recording that makes it possible to prevent unwanted erasure while suppressing degradation of writing capability, and to provide a head assembly and a magnetic recording device each including such a magnetic head.

A magnetic head for perpendicular magnetic recording of the present invention includes a medium facing surface configured to face a recording medium, a coil for producing a magnetic field corresponding to data to be written on the recording medium, a main pole, a write shield formed of a magnetic material, and a gap section formed of a nonmagnetic material. The main pole passes a magnetic flux corresponding to the magnetic field produced by the coil, and produces a write magnetic field for use to write data on the recording medium by means of a perpendicular magnetic recording system. The gap section is provided between the main pole and the write shield.

The main pole has: an end face located in the medium facing surface; a top surface located at a front-side end of the main pole in the direction of travel of the recording medium; a bottom end opposite to the top surface; and a first side surface and a second side surface located at opposite ends of the main pole in the track width direction. The end face of the main pole has a top edge located at an end of the top surface of the main pole, and a first side edge and a second side edge located at respective ends of the first side surface and the second side surface of the main pole. The distance between the first side edge and the second side edge in the track width direction decreases with increasing distance from the top edge. The top surface of the main pole includes a width-changing portion that increases in width in the track width direction with increasing distance from the medium facing surface.

The write shield includes a trailing shield located on the front side in the direction of travel of the recording medium relative to the main pole, a leading shield located on the rear side in the direction of travel of the recording medium relative to the main pole, and a first side shield and a second side shield located on opposite sides of the main pole in the track width direction. The trailing shield has a trailing shield end face located in the medium facing surface at a position on the front side in the direction of travel of the recording medium relative to the end face of the main pole. The leading shield has a leading shield end face located in the medium facing surface at a position on the rear side in the direction of travel of the recording medium relative to the end face of the main pole. The first side shield and the second side shield respectively have a first side shield end face and a second side shield end face located in the medium facing surface at positions on opposite sides of the end face of the main pole in the track width direction.

The gap section includes a trailing gap section for separating the trailing shield from the top surface of the main pole, a leading gap section for separating the leading shield from the bottom end of the main pole, and a first side gap section and a second side gap section for separating the first side shield and the second side shield from the first side surface and the second side surface of the main pole, respectively.

Each of the first and second side gap sections includes a thickness-changing portion that increases in thickness in the track width direction with increasing distance from the medium facing surface. The leading gap section includes a thickness-changing portion that increases in thickness in the direction of travel of the recording medium with increasing distance from the medium facing surface. The thickness of the leading gap section in the direction of travel of the recording medium in the medium facing surface is greater than the width of each of the first and second side gap sections in the track width direction at a position in the medium facing surface closest to the trailing gap section. The width of each of the first and second side gap sections in the track width direction in the medium facing surface decreases with decreasing distance to the leading gap section.

In the magnetic head for perpendicular magnetic recording of the present invention, the thickness-changing portion of each of the first and second side gap sections may have an end located in the medium facing surface.

In the magnetic head for perpendicular magnetic recording of the present invention, the thickness-changing portion of the leading gap section may have an end located in the medium facing surface.

In the magnetic head for perpendicular magnetic recording of the present invention, the width of each of the first and second side gap sections in the track width direction in the medium facing surface may have a maximum value and a minimum value, and the minimum value may be larger than 75% of the maximum value. The minimum value may be smaller than or equal to 90% of the maximum value.

The magnetic head for perpendicular magnetic recording of the present invention may further include a return path section formed of a magnetic material. The return path section connects the write shield and a portion of the main pole located away from the medium facing surface to each other so that a space is defined by the main pole, the gap section, the write shield and the return path section. The coil includes a portion passing through the space.

A head assembly of the present invention includes a slider, and a supporter for flexibly supporting the slider. The slider includes the magnetic head of the present invention and is disposed to face a recording medium.

A magnetic recording device of the present invention includes the magnetic head of the present invention, a recording medium, and a positioning device for supporting the magnetic head and positioning the magnetic head with respect to the recording medium.

By virtue of the features relating to the main pole, the write shield and the gap section, the present invention makes it possible to prevent unwanted erasure while suppressing degradation of writing capability.

Other objects, features and advantages of the present invention will become fully apparent from the following description.

DETAILED DESCRIPTION OF THE PREFERRED EMBODIMENTS

Figure 6:
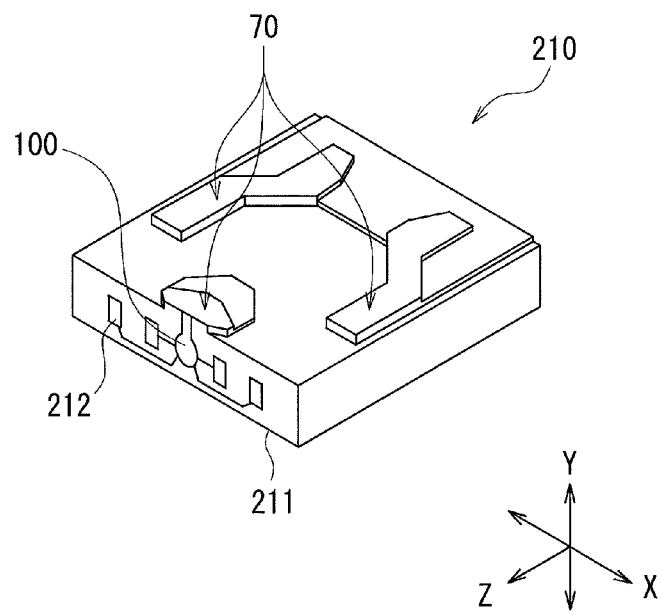
FIG. 6 is a perspective view showing a slider including the magnetic head according to the embodiment of the invention.

An embodiment of the present invention will now be described in detail with reference to the drawings. First, reference is made to FIG. 6 to describe a slider 210 including a magnetic head according to an embodiment of the invention. The magnetic head according to the embodiment is for use in perpendicular magnetic recording. In a magnetic recording device, the slider 210 is disposed to face a circular-plate-shaped recording medium (a magnetic disk) configured to be driven to rotate. In FIG. 6, the X direction is a direction across the tracks of the recording medium, i.e., the track width direction. The Y direction is a direction perpendicular to the surface of the recording medium. The Z direction is the direction of travel of the recording medium as viewed from the slider 210. The X, Y, and Z directions are orthogonal to one another. The slider 210 has a base body 211. The base body 211 is generally hexahedron-shaped. One of the six surfaces of the base body 211 is configured to face the surface of the recording medium. At this one of the six surfaces, there is formed a medium facing surface 70 to face the surface of the recording medium. When the recording medium rotates and travels in the Z direction, an airflow passing between the recording medium and the slider 210 causes a lift below the slider 210 in the Y direction in FIG. 6. The lift causes the slider 210 to fly over the surface of the recording medium. The magnetic head 100 according to the embodiment is formed near the air-outflow-side end (the end in the Z direction) of the slider 210. A plurality of terminals 212 are also provided at the air-outflow-side end of the slider 210.

A head assembly according to the embodiment will now be described with reference to FIG. 7. The head assembly according to the embodiment includes the slider 210 shown in FIG. 6 and a supporter for flexibly supporting the slider 210. Forms of the head assembly include a head gimbal assembly and a head arm assembly described below.

The head gimbal assembly 220 will be described first. The head gimbal assembly 220 includes the slider 210, and a suspension 221 serving as the supporter for flexibly supporting the slider 210. The suspension 221 includes: a plate-spring-shaped load beam 222 formed of, e.g., stainless steel; a flexure 223 to which the slider 210 is joined, the flexure 223 being provided at one end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor for driving the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 7:
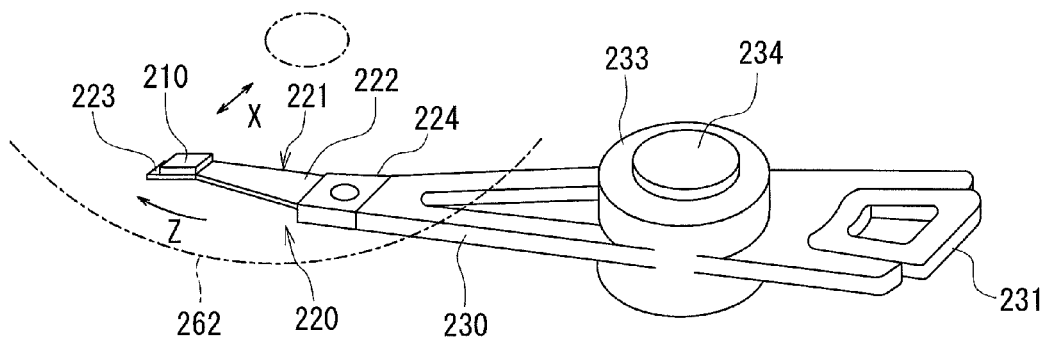
FIG. 7 is a perspective view showing a head arm assembly according to the embodiment of the invention.

FIG. 7 shows the head arm assembly according to the embodiment. In the head arm assembly, the head gimbal assembly 220 is attached to one end of the arm 230. A coil 231 constituting part of the voice coil motor is fixed to the other end of the arm 230. A bearing 233 is provided in the middle of the arm 230. The bearing 233 is attached to a shaft 234 for rotatably supporting the arm 230.

Figure 8:
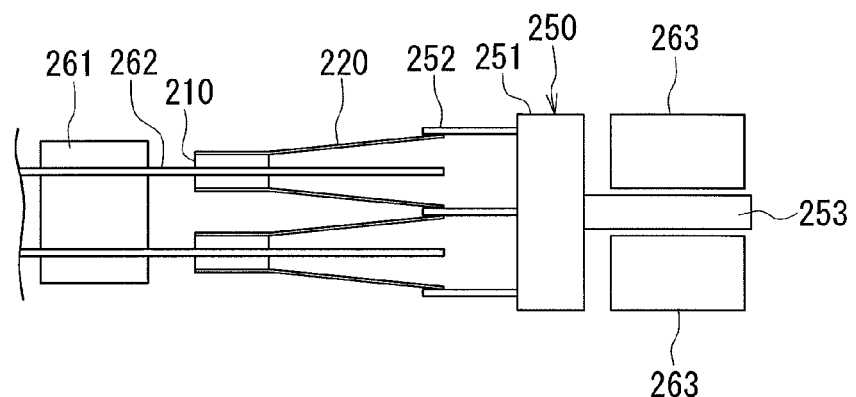
FIG. 8 is an explanatory diagram to illustrate the main part of a magnetic recording device according to the embodiment of the invention.
Figure 9:
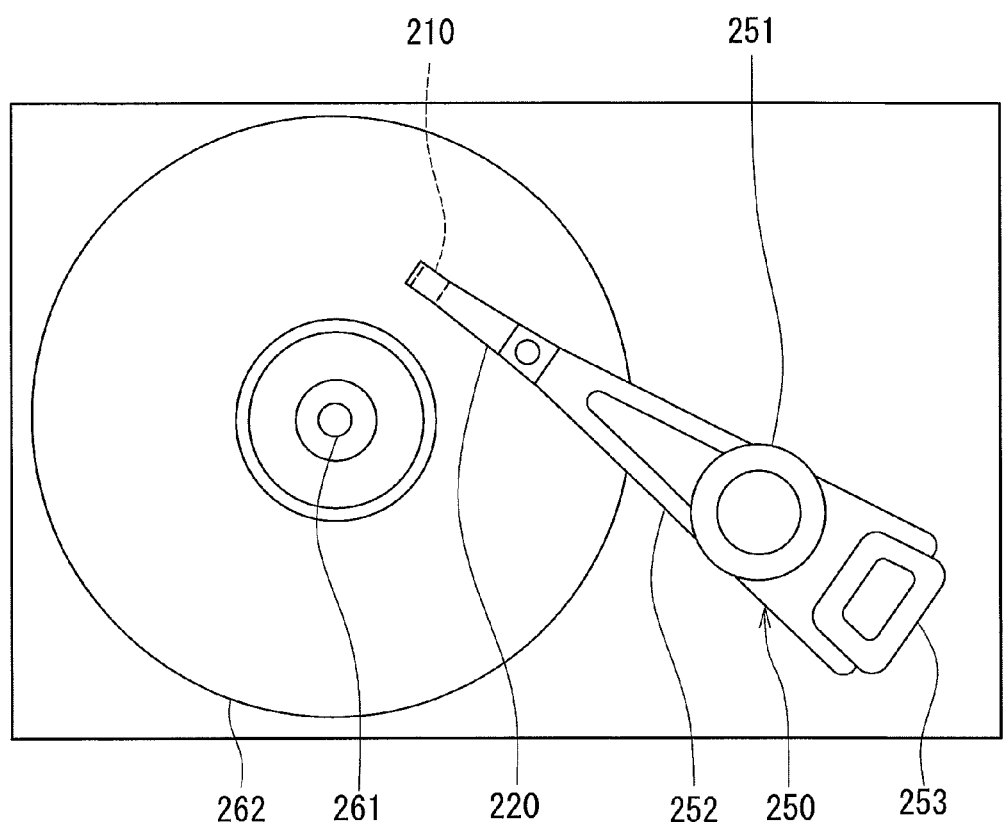
FIG. 9 is a plan view of the magnetic recording device according to the embodiment of the invention.

Reference is now made to FIGS. 8 and 9 to describe an example of the head stack assembly and an example of a magnetic recording device according to the embodiment. FIG. 8 is an explanatory diagram illustrating the main part of the magnetic recording device. FIG. 9 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 constituting part of the voice coil motor is mounted on a side of the carriage 251 opposite from the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 interposed therebetween. The voice coil motor includes permanent magnets 263 arranged to be opposed to each other with the coil 253 of the head stack assembly 250 interposed therebetween. The actuator and the head stack assembly 250 except the sliders 210 support the sliders 210 and position them with respect to the recording media 262. Note that the magnetic recording device of the present invention may be configured otherwise than the above-described configuration. For example, the magnetic recording device of the present invention may be provided with a single recording medium 262 and one or two head gimbal assemblies 220.

In the magnetic recording device according to the embodiment, the actuator moves the slider 210 across the tracks of the recording medium 262 and positions the slider 210 with respect to the recording medium 262. The magnetic head 100 included in the slider 210 is configured to write data on the recording medium 262 by using a write head unit and to read data stored on the recording medium 262 by using a read head unit.

Figure 4:
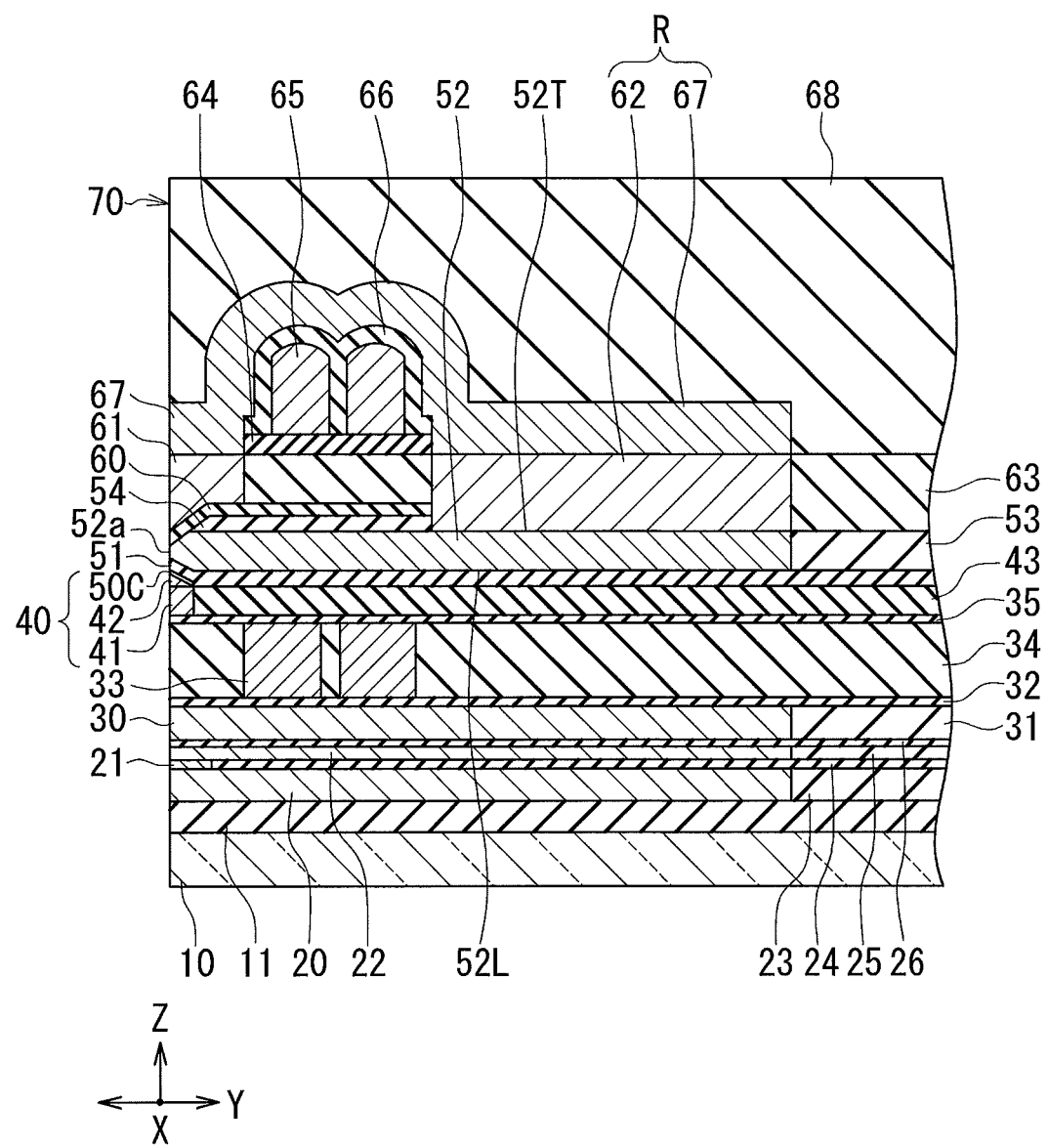
FIG. 4 is a cross-sectional view showing the configuration of the magnetic head according to the embodiment of the invention.
Figure 5:
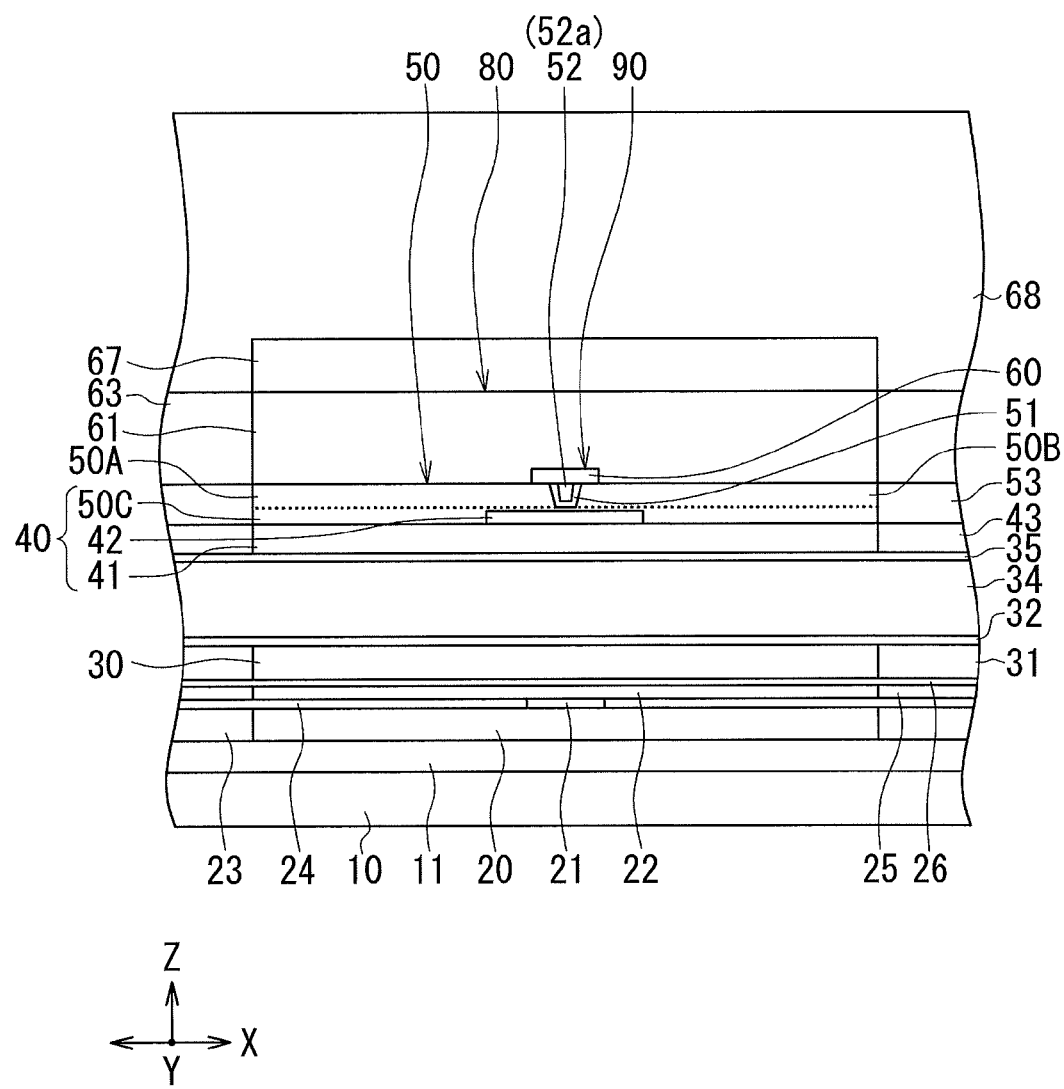
FIG. 5 is a front view showing the medium facing surface of the magnetic head according to the embodiment of the invention.

Reference is now made to FIGS. 4 and 5 to describe the configuration of the magnetic head according to the embodiment. FIG. 4 is a cross-sectional view showing the configuration of the magnetic head. FIG. 5 is a front view showing the medium facing surface of the magnetic head. FIG. 4 shows a cross section perpendicular to the medium facing surface and to the top surface of the substrate. The X, Y, and Z directions shown in FIG. 6 are also shown in FIGS. 4 and 5. In FIG. 4, the X direction is a direction orthogonal to the Y and Z directions. In FIG. 5, the Y direction is a direction orthogonal to the X and Z directions.

As shown in FIG. 4, the magnetic head according to the embodiment has the medium facing surface 70 configured to face the recording medium. As shown in FIGS. 4 and 5, the magnetic head includes: a substrate 10 formed of a ceramic material such as aluminum oxide-titanium carbide ($Al_2O_3$—TiC); an underlying layer 11 formed of an insulating material such as alumina ($Al_2O_3$) and disposed on the substrate 10; a bottom read shield layer 20 formed of a magnetic material and disposed on the underlying layer 11; a magnetoresistive element (hereinafter referred to as MR element) 21 disposed on the bottom read shield layer 20; and a top read shield layer 22 formed of a magnetic material and disposed on the MR element 21.

An end of the MR element 21 is located in the medium facing surface 70. The MR element 21 may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. Where the MR element 21 is a TMR element or a CPP-type GMR element, the bottom read shield layer 20 and the top read shield layer 22 may also serve as electrodes for feeding the sense current to the MR element 21. Where the MR element 21 is a CIP-type GMR element, insulating films are respectively provided between the MR element 21 and the bottom read shield layer 20 and between the MR element 21 and the top read shield layer 22, and two leads are provided between these insulating films in order to feed the sense current to the MR element 21.

The magnetic head further includes: an insulating layer 23 formed of an insulating material and disposed around the bottom read shield layer 20; an insulating layer 24 formed of an insulating material, disposed between the bottom read shield layer 20 and the top read shield layer 22 and surrounding the MR element 21; and an insulating layer 25 formed of an insulating material and disposed around the top read shield layer 22. The insulating layers 23 to 25 are formed of alumina, for example. The parts from the bottom read shield layer 20 to the top read shield layer 22 constitute the read head unit.

The magnetic head further includes an insulating film 26 formed of an insulating material and disposed on the top read shield layer 22 and the insulating layer 25, and the write head unit disposed on the insulating film 26. The insulating film 26 is formed of alumina, for example.

The write head unit includes a coil 65 and a main pole 52. The coil 65 produces a magnetic field corresponding to data to be written on the recording medium. The main pole 52 has an end face 52a located in the medium facing surface 70. The main pole 52 passes a magnetic flux corresponding to the magnetic field produced by the coil 65, and produces a write magnetic field for use to write data on the recording medium by means of a perpendicular magnetic recording system. The coil 65 is formed of a conductive material such as copper.

The write head unit further includes a write shield 80 formed of a magnetic material, and a gap section 90 formed of a nonmagnetic material. The write shield 80 includes a trailing shield 61, a leading shield 40, a first side shield 50A and a second side shield 50B. The trailing shield 61 is located on the trailing side, i.e., the front side in the direction of travel of the recording medium (the Z direction), relative to the main pole 52. The leading shield 40 is located on the leading side, i.e., the rear side in the direction of travel of the recording medium (the Z direction), relative to the main pole 52. The first and second side shields 50A and 50B are located on opposite sides of the main pole 52 in the track width direction (the X direction). The gap section 90 is provided between the main pole 52 and the write shield 80.

The write head unit further includes a middle shield layer 30 formed of a magnetic material and disposed on the insulating layer 26, and an insulating layer 31 formed of an insulating material and disposed around the middle shield layer 30. The insulating layer 31 is formed of alumina, for example. The top surfaces of the middle shield layer 30 and the insulating layer 31 are even with each other.

The write head unit further includes an insulating film 32 formed of an insulating material and disposed on the middle shield layer 30 and the insulating layer 31, and a coil 33 formed of a conductive material and disposed on the insulating film 32. The coil 33 is flat spiral-shaped. The write head unit further includes an insulating layer 34 formed of an insulating material and disposed around the coil 33 and in the space between adjacent turns of the coil 33. The insulating film 32 and the insulating layer 34 are formed of alumina, for example. The top surfaces of the coil 33 and the insulating layer 34 are even with each other.

The write head unit further includes an insulating film 35 formed of an insulating material and disposed on the coil 33 and the insulating layer 34. The insulating film 35 is formed of alumina, for example.

The leading shield 40 includes a first layer 41 lying on the insulating film 35, a second layer 42 lying on the first layer 41, and a third layer 50C lying over the first layer 42 and the second layer 42. As shown in FIG. 5, the second layer 42 is smaller than the first layer 41 in width in the track width direction (the X direction). The write head unit 9 further includes a magnetic layer 50 formed of a magnetic material and constituting the first side shield 50A, the second side shield 50B and the third layer 50C. In FIG. 5, the boundaries between the third layer 50C and the first and second side shields 50A, 50B in the magnetic layer 50 are indicated by dotted lines. The third layer 50C will be described in detail later.

The write head unit further includes an insulating layer 43 formed of an insulating material and disposed around the first layer 41 of the leading shield 40. The insulating layer 43 is formed of alumina, for example.

The first and second side shields 50A and 50B are disposed on the leading shield 40 and adjacent to each other in the track width direction (the X direction) with spacing therebetween. The first side shield 50A has a sidewall opposed to a first side surface of the main pole 52 to be described later. The second side shield 50B has a sidewall opposed to a second side surface of the main pole 52 to be described later.

The write head unit further includes a first gap layer 51 formed of a nonmagnetic material. The first gap layer 51 is disposed to cover the top surface of the leading shield 40, the sidewalls of the first and second side shields 50A and 50B and the top surface of the insulating layer 43. The first gap layer 51 is formed of alumina, for example.

The main pole 52 lies above the leading shield 40 and the insulating layer 43. The first gap layer 51 is interposed between the main pole 52 and each of the leading shield 40, the insulating layer 43 and the first and second side shields 50A and 50B.

The main pole 52 has a top surface 52T and a bottom end 52L in addition to the end face 52a mentioned previously. The top surface 52T is located at the trailing-side end of the main pole 52, i.e. the front-side end of the main pole 52 in the direction of travel of the recording medium (the Z direction). The bottom end 52L is opposite to the top surface 52T. The shape of the main pole 52 will be described in detail later.

The write head unit further includes a nonmagnetic layer 53 formed of a nonmagnetic material and disposed around the first and second side shields 50A and 50B and the main pole 52. The nonmagnetic layer 53 is formed of alumina, for example.

The write head unit further includes a nonmagnetic layer 54 formed of a nonmagnetic material and lying on a first portion of the top surface 52T of the main pole 52, the first portion being located away from the medium facing surface 70. The nonmagnetic layer 54 has an end face facing toward the medium facing surface 70 and located at a distance from the medium facing surface 70. The distance from the medium facing surface 70 to an arbitrary point on the end face of the nonmagnetic layer 54 increases with increasing distance from the arbitrary point to the top surface of the substrate 10.

The nonmagnetic layer 54 is formed of an inorganic insulating material or a metal material, for example. Examples of inorganic insulating materials that can be used to form the nonmagnetic layer 54 include alumina and $SiO_2$. Examples of metal materials that can be used to form the nonmagnetic layer 54 include Ru and Ti.

The write head unit further includes a second gap layer 60 formed of a nonmagnetic material. The second gap layer 60 lies on the nonmagnetic layer 54 and a portion of the main pole 52. The second gap layer 60 is formed of alumina, for example. The gap section 90 is constituted by a portion of the first gap layer 51 and a portion of the second gap layer 60. The gap section 90 will be described in detail later.

The write head unit further includes a return path section R formed of a magnetic material. The return path section R includes a first yoke layer 62 and a second yoke layer 67. The first yoke layer 62 lies on a second portion of the top surface 52T of the main pole 52, the second portion being located away from the medium facing surface 70. The second portion of the top surface 52T of the main pole 52 is located farther from the medium facing surface 70 than is the first portion of the top surface 52T of the main pole 52.

The trailing shield 61 lies on the first side shield 50A, the second side shield 50B and the second gap layer 60. The write head unit further includes an insulating layer 63 formed of an insulating material and disposed around the trailing shield 61 and the first yoke layer 62. The insulating layer 63 is formed of alumina, for example. The top surfaces of the trailing shield 61, the first yoke layer 62 and the insulating layer 63 are even with each other.

The write head unit further includes an insulating film 64 formed of an insulating material and lying on the insulating layer 63. The coil 65 lies on the insulating film 64. The write head unit further includes an insulating film 66 formed of an insulating material and disposed to cover the insulating film 64 and the coil 65. The insulating films 64 and 66 are formed of alumina, for example. The coil 65 is flat spiral-shaped.

The second yoke layer 67 lies on the trailing shield 61, the first yoke layer 62 and the insulating film 66, and connects the trailing shield 61 and the first yoke layer 62.

The magnetic head further includes a protective layer 68 formed of an insulating material such as alumina and disposed to cover the second yoke layer 67. The base body 211 shown in FIG. 6 is mainly constituted by the substrate 10 and the protective layer 68 shown in FIGS. 4 and 5.

As has been described, the magnetic head according to the embodiment includes the medium facing surface 70, the read head unit, and the write head unit. The read head unit and the write head unit are stacked on the substrate 10. The read head unit is located on the leading side, i.e., the rear side in the direction of travel of the recording medium (the Z direction), relative to the write head unit.

The write head unit includes the coil 65, the main pole 52, the write shield 80, the gap section 90, and the return path section R. The write shield 80 includes the trailing shield 61, the leading shield 40, and the first and second side shields 50A and 50B. The gap section 90 is constituted by a portion of the first gap layer 51 and a portion of the second gap layer 60. The return path section R includes the first yoke layer 62 and the second yoke layer 67.

As shown in FIG. 4, the return path section R connects the write shield 80 (the trailing shield 61) and a portion of the main pole 52 located away from the medium facing surface 70 to each other so that a space is defined by the main pole 52, the gap section 90 (the first and second gap layers 51 and 60), the write shield 80 and the return path section R. The coil 65 includes a portion passing through the aforementioned space.

The write shield 80 captures a disturbance magnetic field applied to the magnetic head from the outside thereof. This makes it possible to prevent the disturbance magnetic field from being intensively captured into the main pole 52 and thereby causing erroneous writing on the recording medium. The write shield 80 also has the function of capturing a magnetic flux that is produced from the end face 52a of the main pole 52 and spreads in directions other than a direction perpendicular to the plane of the recording medium, and thereby preventing the magnetic flux from reaching the recording medium. Furthermore, the write shield 80 and the return path section R have the function of allowing a magnetic flux that has been produced from the end face 52a of the main pole 52 and has magnetized a portion of the recording medium to flow back to the main pole 52.

The write head unit further includes the middle shield layer 30 and the coil 33. When a write current is supplied to the coils 33 and 65, magnetic fields produced at the respective center portions of the coils 33 and 65 are in mutually opposite directions. The coil 65 produces a magnetic field corresponding to data to be written on the recording medium. The coil 33 produces a magnetic field that prevents the magnetic field produced by the coil 65 from affecting the read head unit. The middle shield layer 30 has the function of shielding the read head unit from magnetic fields produced in the write head unit.

Figure 1:
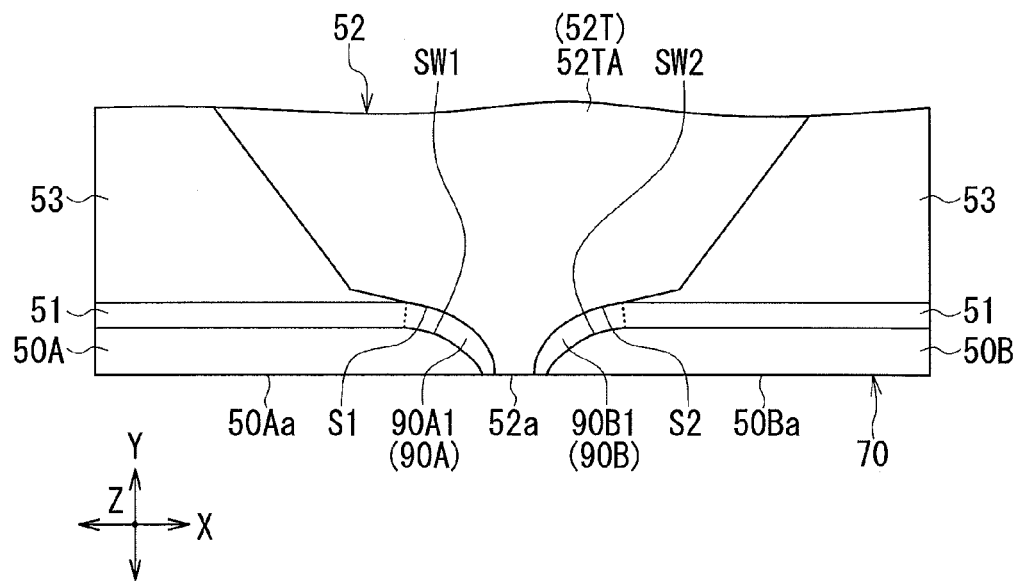
FIG. 1 is a plan view showing the main part of a magnetic head according to an embodiment of the invention.
Figure 2:
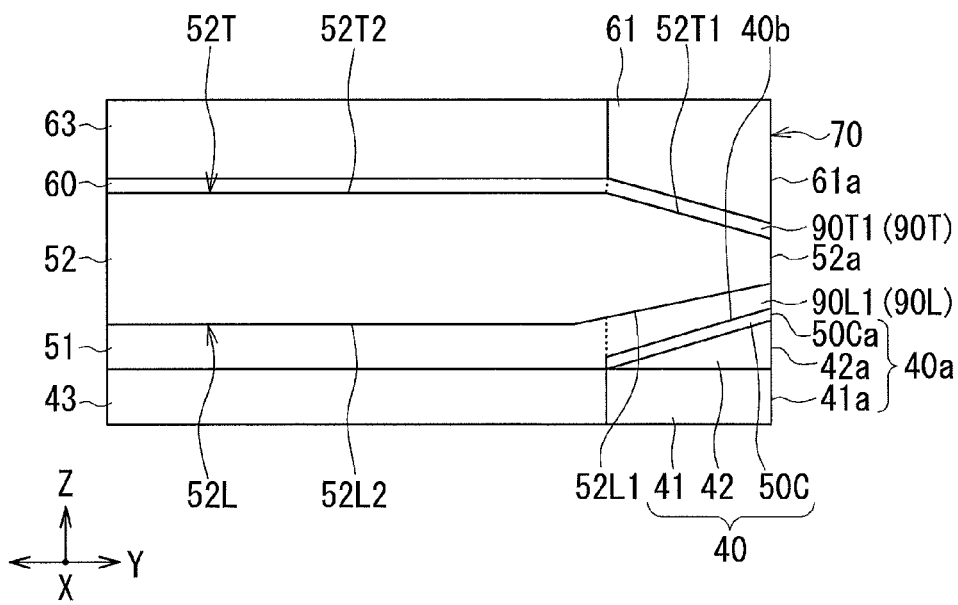
FIG. 2 is a cross-sectional view showing the main part of the magnetic head according to the embodiment of the invention.
Figure 3:
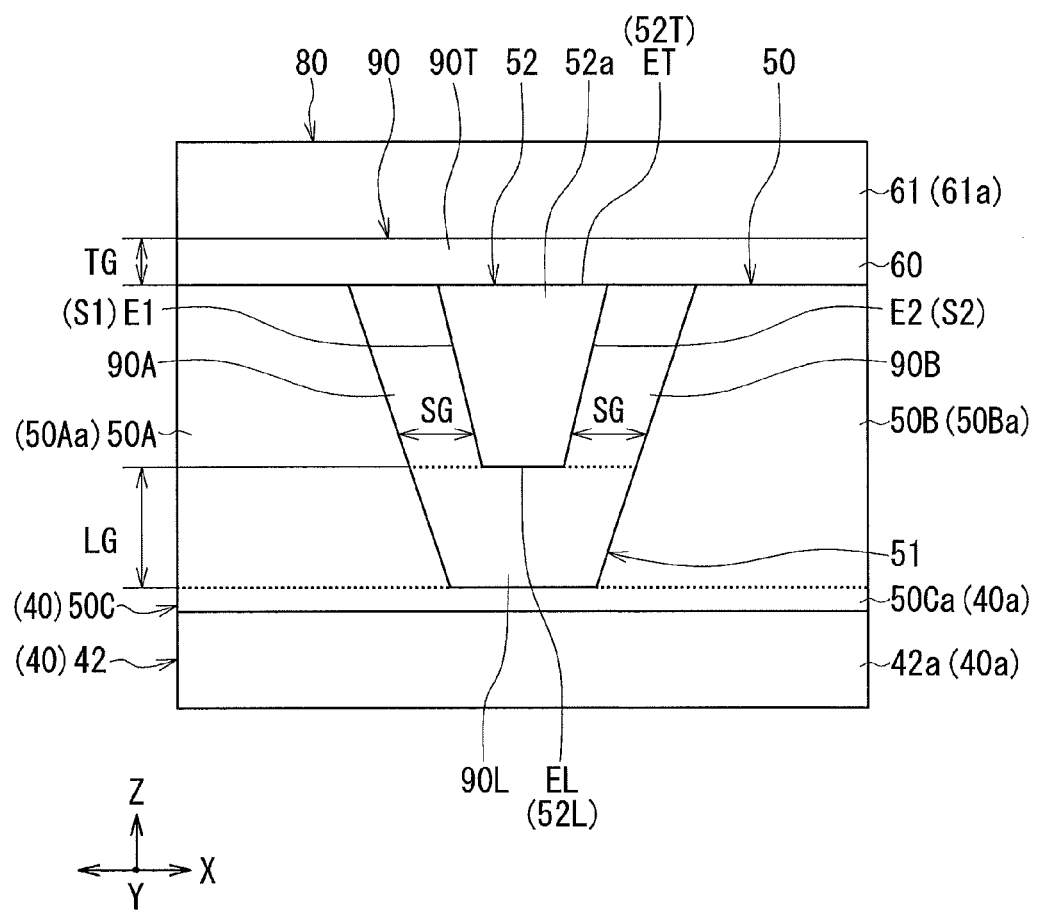
FIG. 3 is a front view showing the main part of the magnetic head according to the embodiment of the invention.

The main pole 52, the write shield 80 and the gap section 90 will now be described in detail with reference to FIGS. 1 to 3. FIG. 1 is a plan view showing the main part of the magnetic head. FIG. 2 is a cross-sectional view showing the main part of the magnetic head. FIG. 3 is a front view showing the main part of the magnetic head.

The main pole 52 has the end face 52a, the top surface 52T and the bottom end 52L described previously, and further has, as shown in FIG. 1, a first side surface S1 and a second side surface S2 located at opposite ends of the main pole 52 in the track width direction (the X direction). In FIG. 1, the reference symbol SW1 denotes the sidewall of the first side shield 50A, and the reference symbol SW2 denotes the sidewall of the second side shield 50B. The sidewall SW1 of the first side shield 50A is opposed to the first side surface S1 of the main pole 52 with the first gap layer 51 interposed therebetween. The sidewall SW2 of the second side shield 50B is opposed to the second side surface S2 of the main pole 52 with the first gap layer 51 interposed therebetween.

As shown in FIG. 3, the end face 52a of the main pole 52 has a top edge ET located at an end of the top surface 52T of the main pole 52, a first side edge E1 located at an end of the first side surface S1 of the main pole 52, and a second side edge E2 located at an end of the second side surface S2 of the main pole 52. The length of the top edge ET defines the track width. The position of an end of a record bit to be recorded on the recording medium is determined by the position of the top edge ET. The distance between the first side edge E1 and the second side edge E2 in the track width direction (the X direction) decreases with increasing distance from the top edge ET. In the example shown in FIG. 3, the end face 52a of the main pole 52 further has a bottom edge EL located at an end of the bottom end 52L of the main pole 52.

As shown in FIG. 1, the top surface 52T of the main pole 52 includes a width-changing portion 52TA that increases in width in the track width direction (the X direction) with increasing distance from the medium facing surface 70. In the example shown in FIG. 1, the width-changing portion 52TA has an end located in the medium facing surface 70.

As shown in FIG. 2, the top surface 52T of the main pole 52 includes a first inclined portion 52T1 and a first flat portion 52T2, the first inclined portion 52T1 being closer to the medium facing surface 70 than the first flat portion 52T2. The first inclined portion 52T1 has a first end located in the medium facing surface 70 and a second end opposite thereto. The first flat portion 52T2 is connected to the second end. The first inclined portion 52T1 is inclined such that the second end is located on the trailing side, i.e., the front side in the direction of travel of the recording medium (the Z direction), relative to the first end. The first flat portion 52T2 extends in a direction substantially perpendicular to the medium facing surface 70.

As shown in FIG. 2, the bottom end 52L of the main pole 52 includes a second inclined portion 52L1 and a second flat portion 52L2, the second inclined portion 52L1 being closer to the medium facing surface 70 than the second flat portion 52L2. The second inclined portion 52L1 has a third end located in the medium facing surface 70 and a fourth end opposite thereto. The second inclined portion 52L1 may be an edge formed by two intersecting planes, or may be a plane connecting two planes to each other. The second flat portion 52L2 is a plane connected to the fourth end of the second inclined portion 52L1. The second inclined portion 52L1 is inclined such that the fourth end is located on the leading side, i.e., the rear side in the direction of travel of the recording medium (the Z direction), relative to the third end. The second flat portion 52L2 extends in a direction substantially perpendicular to the medium facing surface 70.

As shown in FIGS. 2 and 3, the trailing shield 61 of the write shield 80 has a trailing shield end face 61a located in the medium facing surface 70 at a position on the trailing side, i.e., the front side in the direction of travel of the recording medium (the Z direction), relative to the end face 52a of the main pole 52. The leading shield 40 of the write shield 80 has a top surface, and a leading shield end face 40a located in the medium facing surface 70 at a position on the leading side, i.e., the rear side in the direction of travel of the recording medium, relative to the end face 52a of the main pole 52. The top surface of the leading shield 40 includes a third inclined portion 40b opposed to the second inclined portion 52L1 of the bottom end 52L of the main pole 52 with the first gap layer 51 interposed therebetween. The distance from the top surface of the substrate 10 to an arbitrary point on the third inclined portion 40b decreases with increasing distance from the arbitrary point to the medium facing surface 70.

The first layer 41 of the leading shield 40 has a top surface, and an end face 41a located in the medium facing surface 70. The second layer 42 of the leading shield 40 has a bottom surface in contact with the top surface of the first layer 41, an end face 42a located in the medium facing surface 70, and an inclined surface facing toward the second inclined portion 52L1 of the bottom end 52L of the main pole 52. The distance from the top surface of the substrate 10 to an arbitrary point on the inclined surface of the second layer 42 decreases with increasing distance from the arbitrary point to the medium facing surface 70. The third layer 50C of the leading shield 40 extends along the top surface of the first layer 41 and the inclined surface of the second layer 42. The third layer 50C has an end face 50Ca located in the medium facing surface 70. In the embodiment, the leading shield end face 40a is constituted by the end face 41a of the first layer 41, the end face 42a of the second layer 42 and the end face 50Ca of the third layer 50C. A portion of the third layer 50C that extends along the inclined surface of the second layer 42 will be referred to as the inclined portion. The third inclined portion 40b of the top surface of the leading shield 40 is constituted by the top surface of the inclined portion of the third layer 50C. The third layer 50C is not an essential component of the magnetic head, and can be dispensed with. In such a case, the third inclined portion 40b of the top surface of the leading shield 40 is constituted by the inclined surface of the second layer 42.

As shown in FIGS. 1 and 3, the first and second side shields 50A and 50B of the write shield 80 respectively have first and second side shield end faces 50Aa and 50Ba located in the medium facing surface 70 at positions on opposite sides of the end face 52a of the main pole 52 in the track width direction (the X direction).

In the embodiment, the first side shield 50A, the second side shield 50B and the third layer 50C of the leading shield 40 are formed of the single magnetic layer 50. In FIG. 3, the boundaries between the third layer 50C and the first and second side shields 50A, 50B in the magnetic layer 50 are indicated by dotted lines. The magnetic layer 50 has the sidewalls SW1 and SW1 mentioned previously. In the embodiment, the third layer 50C is a portion of the magnetic layer 50 that is located on the rear side in the direction of travel of the recording medium (the Z direction) relative to the sidewalls SW1 and SW2.

As shown in FIGS. 1 to 3, the gap section 90 includes a trailing gap section 90T for separating the trailing shield 61 from the top surface 52T of the main pole 52, a leading gap section 90L for separating the leading shield 40 from the bottom end 52L of the main pole 52, and a first side gap section 90A and a second side gap section 90B for separating the first side shield 50A and the second side shield 50B from the first side surface S1 and the second side surface S2 of the main pole 52, respectively. The trailing gap section 90T is constituted by a portion of the second gap layer 60 that is interposed between the main pole 52 and the trailing shield 61. In FIG. 2, the boundary between the trailing gap section 90T and the remainder of the second gap layer 60 is indicated by a dotted line.

The leading gap section 90L is constituted by a portion of the first gap layer 51 that is interposed between the main pole 52 and the leading shield 40. The first side gap section 90A is constituted by a portion of the first gap layer 51 that is interposed between the main pole 52 and the first side shield 50A. The second side gap section 90B is constituted by a portion of the first gap layer 51 that is interposed between the main pole 52 and the second side shield 50B. In FIG. 3, the boundaries between the leading gap section 90L and the first and second side gap sections 90A, 90B are indicated by dotted lines.

As shown in FIG. 3, in the medium facing surface 70 the leading gap section 90L is greater than the trailing gap section 90T in thickness in the direction of travel of the recording medium (the Z direction). In FIG. 3, the reference symbol TG denotes the thickness of the trailing gap section 90T in the direction of travel of the recording medium in the medium facing surface 70, and the reference symbol LG denotes the thickness of the leading gap section 90L in the direction of travel of the recording medium in the medium facing surface 70. The thickness LG of the leading gap section 90L is greater than the width of each of the first and second side gap sections 90A and 90B in the track width direction (the X direction) at a position in the medium facing surface 70 closest to the trailing gap section 90T.

As shown in FIG. 3, the width of each of the first and second side gap sections 90A and 90B in the track width direction (the X direction) in the medium facing surface 70 decreases with decreasing distance to the leading gap section 90L. In FIG. 3, the reference symbol SG denotes the width of each of the first and second side gap sections 90A and 90B. The width SG has a maximum value SGmax and a minimum value SGmin. In the example shown in FIG. 3, the width SG takes on the maximum value SGmax at the position closest to the trailing gap section 90T, and takes on the minimum value SGmin at the position closest to the leading gap section 90L. The minimum value SGmin is preferably larger than 75% of the maximum value SGmax. Further, the minimum value SGmin is preferably smaller than or equal to 90% of the maximum value SGmax. The reasons therefor will be described in detail later.

FIG. 2 shows a portion of the first gap layer 51 that is located on the leading side relative to the main pole 52, indicating the boundary between the leading gap section 90L and the remainder of the portion of the first gap layer 51 by a dotted line. As shown in FIG. 2, the leading gap section 90L includes a thickness-changing portion 90L1 that increases in thickness in the direction of travel of the recording medium (the Z direction) with increasing distance from the medium facing surface 70. In the embodiment, in particular, the thickness-changing portion 90L1 of the leading gap section 90L has an end located in the medium facing surface 70. Further, in the embodiment, the entire leading gap section 90L is constituted by the thickness-changing portion 90L1.

FIG. 1 shows two portions of the first gap layer 51 that are located on opposite sides of the main pole 52 in the track width direction, indicating the boundary between the first side gap section 90A and the remainder of one of the two portions and the boundary between the second side gap section 90B and the remainder of the other of the two portions by dotted lines. As shown in FIG. 1, each of the first and second side gap sections 90A and 90B includes a thickness-changing portion that increases in thickness in the track width direction (the X direction) with increasing distance from the medium facing surface 70. In FIG. 1, the reference symbol 90A1 denotes the thickness-changing portion of the first side gap section 90A, and the reference symbol 90B1 denotes the thickness-changing portion of the second side gap section 90B. In the embodiment, in particular, each of the thickness-changing portion 90A1 of the first side gap section 90A and the thickness-changing portion 90B1 of the second side gap section 90B has an end located in the medium facing surface 70.

A method of manufacturing the magnetic head according to the embodiment will now be described. As shown in FIGS. 4 and 5, the method of manufacturing the magnetic head according to the embodiment first forms the underlying layer 11, the bottom read shield layer 20 and the insulating layer 23 in this order on the substrate 10. Next, the MR element 21 is formed on the bottom read shield layer 20, and the insulating layer 24 is formed on the bottom read shield layer 20 and the insulating layer 23. Then, the top read shield layer 22, the insulating layer 25 and the insulating film 26 are formed in this order on the MR element 21 and the insulating layer 24.

Next, the middle shield layer 30 is formed on the insulating film 26 by frame plating, for example. The insulating layer 31 is then formed to cover the middle shield layer 30. The insulating layer 31 is then polished by, for example, chemical mechanical polishing (hereinafter referred to as CMP), until the middle shield layer 30 is exposed. Then, the insulating film 32 is formed over the entire top surface of the stack. The coil 33 is then formed on the insulating film 32 by frame plating, for example. The insulating layer 34 is then formed to cover the coil 33. The insulating layer 34 is then polished by, for example, CMP, until the coil 33 is exposed. Then, the insulating film 35 is formed over the entire top surface of the stack.

Next, the first layer 41 of the leading shield 40 is formed on the insulating film 35 by frame plating, for example. The insulating layer 43 is then formed to cover the first layer 41. The insulating layer 43 is then polished by, for example, CMP, until the first layer 41 is exposed. Next, a magnetic layer, which will later become the second layer 42 of the leading shield 40 upon formation of the inclined surface thereof, is formed on the first layer 41 by sputtering, for example. A portion of the magnetic layer is then taper-etched by, for example, reactive ion etching, so that the magnetic layer is provided with the inclined surface of the second layer 42. This makes the magnetic layer into the second layer 42.

Reference is now made to FIGS. 10A to 13C to describe a series of steps following the formation of the second layer 42. FIGS. 10A to 13C each show a stack of layers formed in the process of manufacturing the magnetic head. FIG. nA (n is any integer between 10 and 13 inclusive) shows a cross section of the stack taken at the location at which the medium facing surface 70 is to be formed. FIG. nB shows the top surface of part of the stack. FIG. nC shows a cross section perpendicular to the medium facing surface 70 and to the top surface of the substrate 10. In FIG. nB, the reference symbol "ABS" denotes an imaginary plane representative of the location at which the medium facing surface 70 is to be formed. The line nC-nC on FIG. nB indicates the location of the cross section shown in FIG. nC.

Figure 10A:
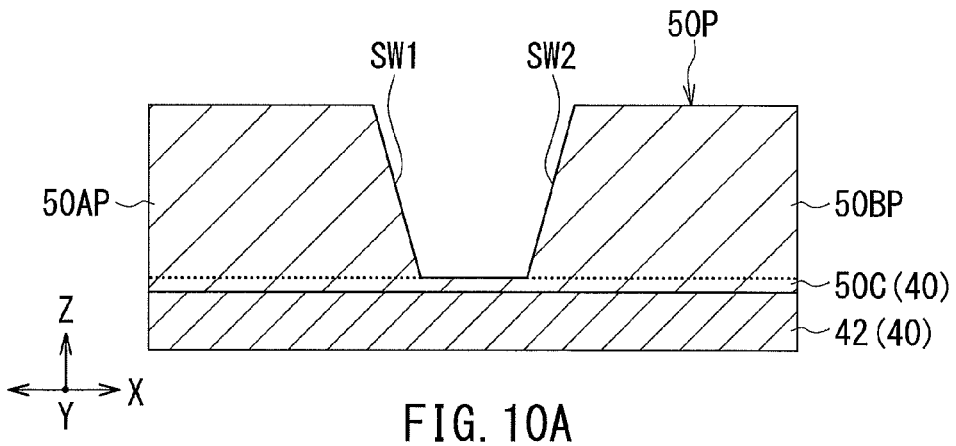
FIGS. 10A to 10C are explanatory diagrams showing a step of a method of manufacturing the magnetic head according to the embodiment of the invention.
Figure 10B:
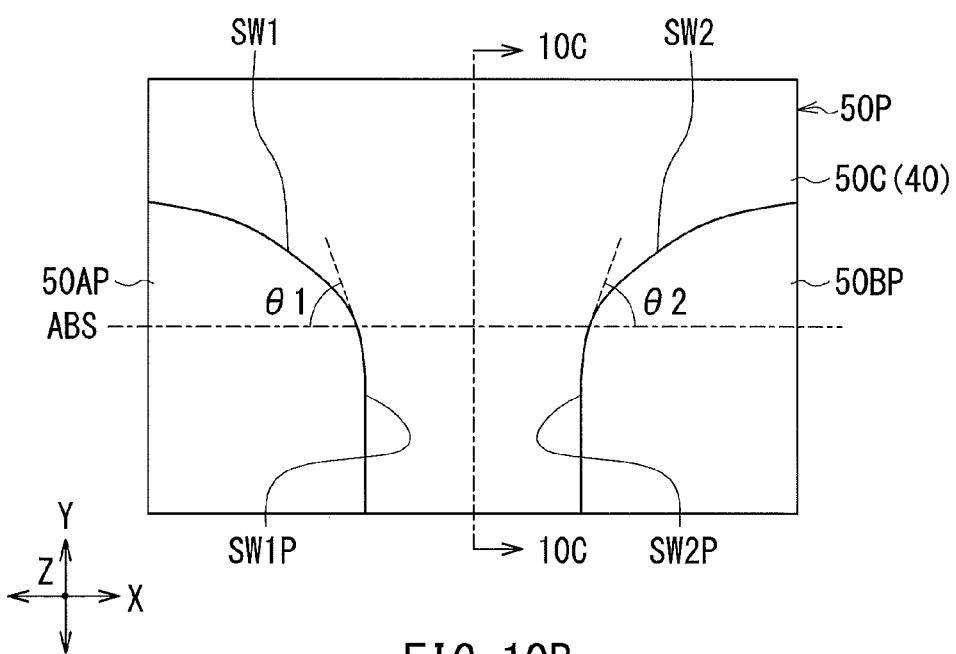
Figure 10C:
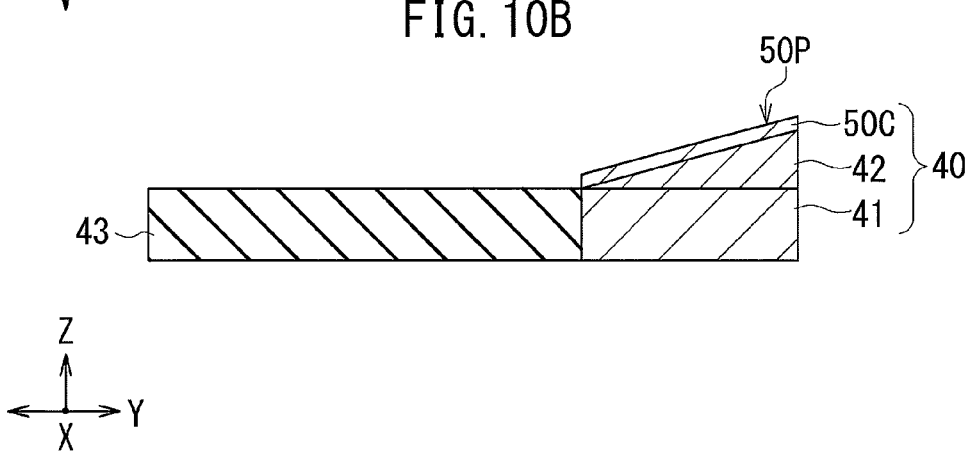

FIGS. 10A to 10C show the step following the formation of the second layer 42. In this step, an initial magnetic layer 50P is formed on the first layer 41 and the second layer 42 of the leading shield 40 by frame plating, for example. The initial magnetic layer 50P includes a first initial side shield 50AP and a second initial side shield 50BP which will later become the first side shield 50A and the second side shield 50B, respectively, and further includes the third layer 50C of the leading shield 40. In FIG. 10A, the boundaries between the third layer 50C and the first and second initial side shields 50AP, 50BP in the initial magnetic layer 50P are indicated by dotted lines. Any figures similar to FIG. 10A, to be referred to for descriptions below, will also employ the same way of representation as in FIG. 10A. The first initial side shield 50AP has a sidewall SW1P including the sidewall SW1. The second initial side shield 50BP has a sidewall SW2P including the sidewall SW2. In this step, the first and second initial side shields 50AP and 50BP are formed such that the sidewalls SW1P and SW2P are inclined relative to the Z direction.

Each of the sidewalls SW1P and SW2P has an edge farthest from the top surface of the substrate 10. As shown in FIG. 10B, the reference symbol θ1 denotes the angle formed between the imaginary plane ABS and a tangent to the edge of the sidewall SW1P at the point of intersection of the edge of the sidewall SW1P and the imaginary plane ABS, and the reference symbol θ2 denotes the angle formed between the imaginary plane ABS and a tangent to the edge of the sidewall SW2P at the point of intersection of the edge of the sidewall SW2P and the imaginary plane ABS. The imaginary plane ABS, that is, the location at which the medium facing surface 70 is to be formed, is determined so that the angles θ1 and θ2 will be smaller than 90°, for example. As a result, the distance between the sidewalls SW1 and SW2 increases with increasing distance from the imaginary plane ABS.

Figure 11A:
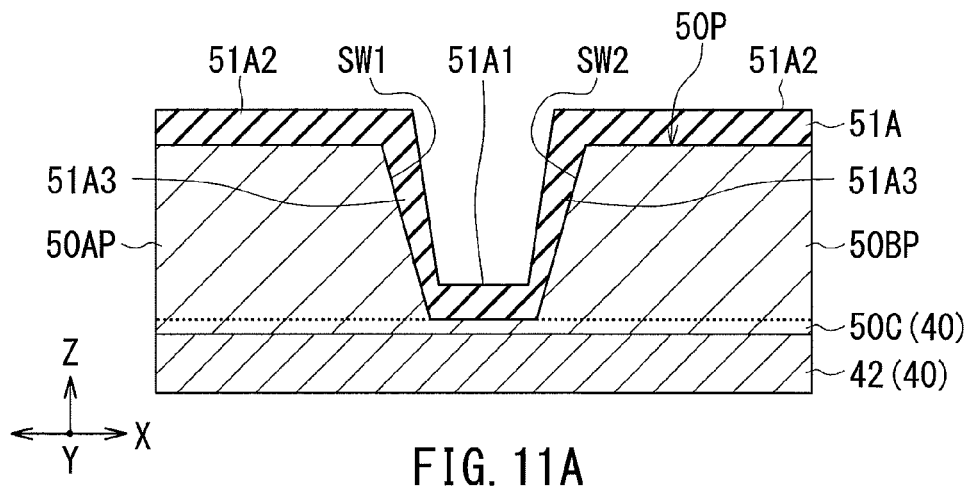
FIGS. 11A to 11C are explanatory diagrams showing a step that follows the step shown in FIGS. 10A to 10C.
Figure 11B:
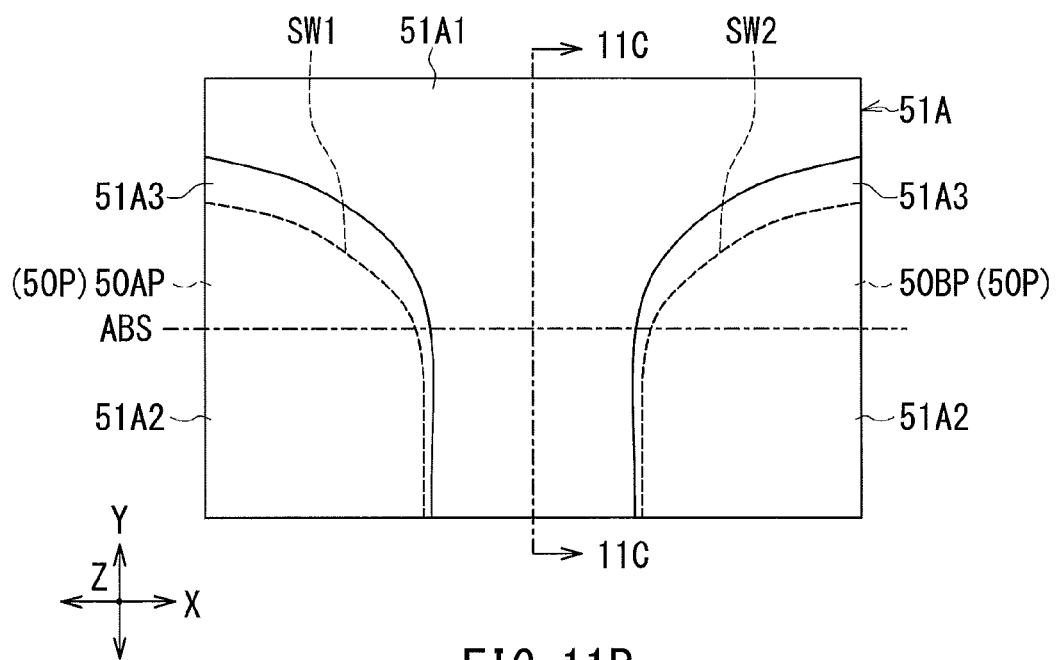
Figure 11C:
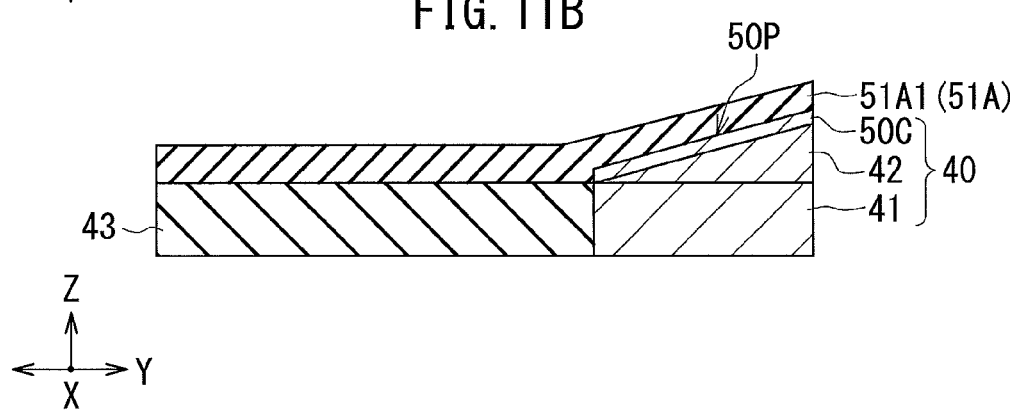

FIGS. 11A to 11C show the next step. In this step, a first nonmagnetic film 51A of a nonmagnetic material is formed over the entire top surface of the stack. The first nonmagnetic film 51A constitutes at least part of the first gap layer 51 to be formed later. The first nonmagnetic film 51A includes: a first deposition portion 51A1 formed over the top surface of the inclined portion of the third layer 50C and the top surface of the insulating layer 43; two second deposition portions 51A2 formed on the respective top surfaces of the first and second initial side shields 50AP and 50BP; and two adhesion portions 51A3 adhering to the sidewalls SW1 and SW2. The first deposition portion 51A1 includes a portion that constitutes at least part of the leading gap section 90L shown in FIGS. 2 and 3. The two adhesion portions 51A3 include respective portions that constitute at least portions of the first and second side gap sections 90A and 90B shown in FIGS. 1 and 3.

The first nonmagnetic film 51A is formed by physical vapor deposition. Typically, when a film is formed by physical vapor deposition on a structure including a groove that opens in the top surface of the structure, the resultant film could not have a uniform thickness. More specifically, the resultant film has a smaller thickness inside the groove than on the top surface of the structure. Further, the film thickness inside the groove decreases with decreasing width of the groove. The film thickness on the bottom of the groove is greater than that on the sidewall of the groove. The film thickness on the sidewall of the groove decreases toward the bottom of the groove.

Therefore, when the first nonmagnetic film 51A is formed by physical vapor deposition, the thickness of the first deposition portion 51A1 becomes greater than the maximum thickness of each of the two adhesion portions 51A3. Further, the thickness of each of the two adhesion portions 51A3 decreases with decreasing distance to the first deposition portion 51A1, and increases with increasing distance between the sidewall SW1 and the sidewall SW2, that is, with increasing distance from the imaginary plane ABS. The thickness of the first deposition portion 51A1 increases with increasing distance between the sidewall SW1 and the sidewall SW2, that is, with increasing distance from the imaginary plane ABS.

Figure 12A:
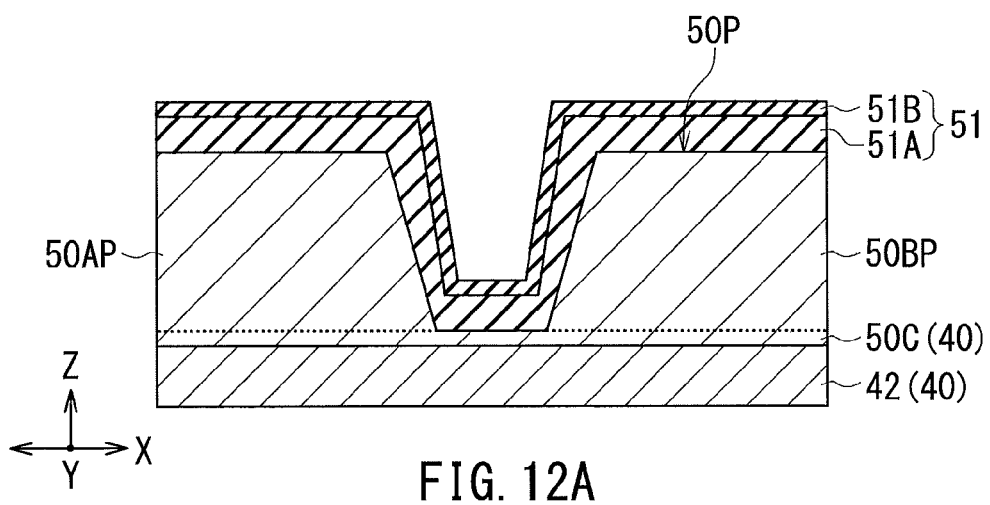
FIGS. 12A to 12C are explanatory diagrams showing a step that follows the step shown in FIGS. 11A to 11C.
Figure 12B:
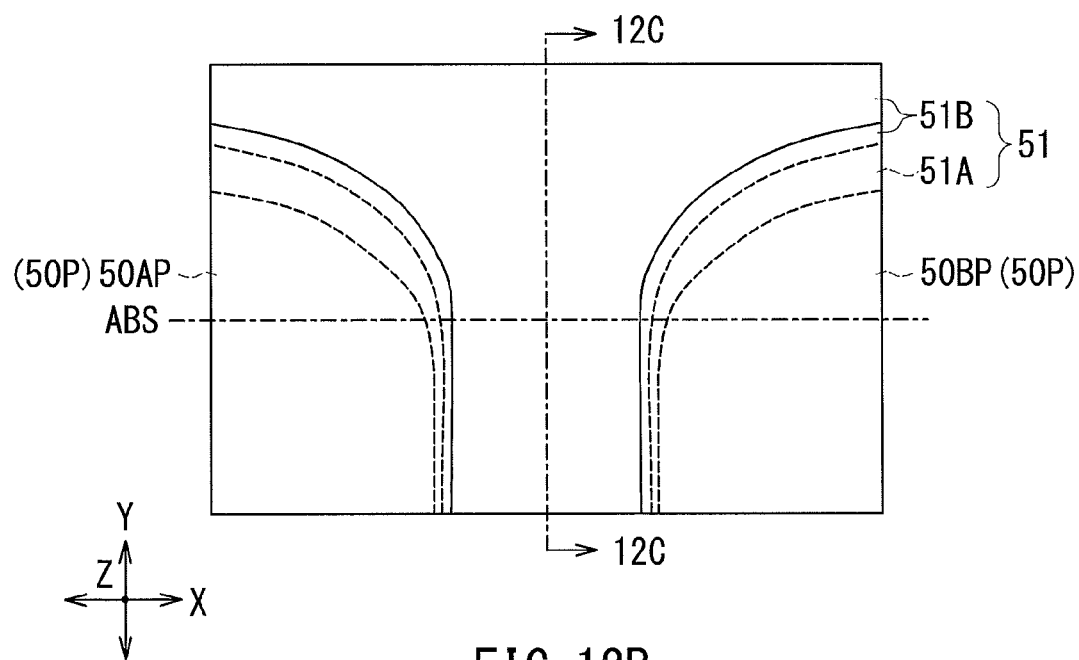
Figure 12C:
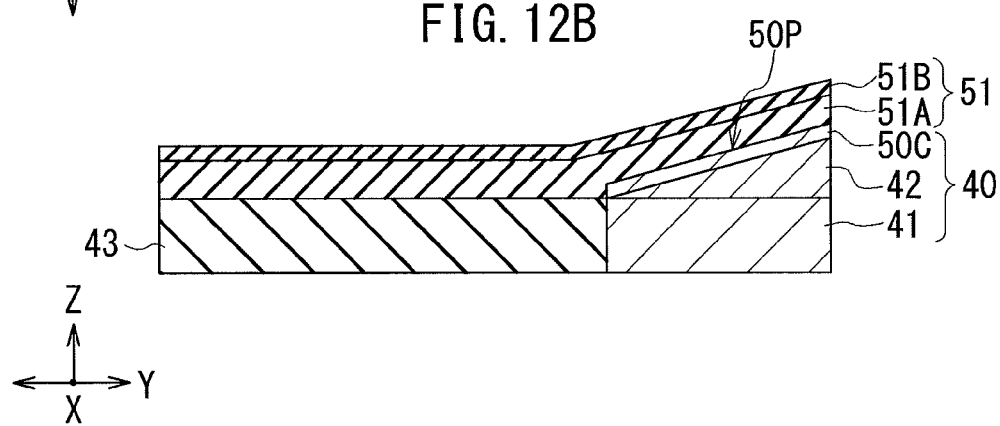

FIGS. 12A to 12C show the next step. In this step, a second nonmagnetic film 51B of a nonmagnetic material is formed over the entire top surface of the stack. The second nonmagnetic film 51B constitutes the remainder of the first gap layer 51. The first gap layer 51 is completed by the formation of the second nonmagnetic film 51B. The second nonmagnetic film 51B is preferably formed by atomic layer deposition. This allows the resultant second nonmagnetic film 51B to have a uniform thickness. The thickness of the second nonmagnetic film 51B may be smaller than that of the first nonmagnetic film 51A.

The second nonmagnetic film 51B is not an essential component of the magnetic head, and can be dispensed with. In such a case, the entire first gap layer 51 is constituted by the first nonmagnetic film 51A.

Figure 13A:
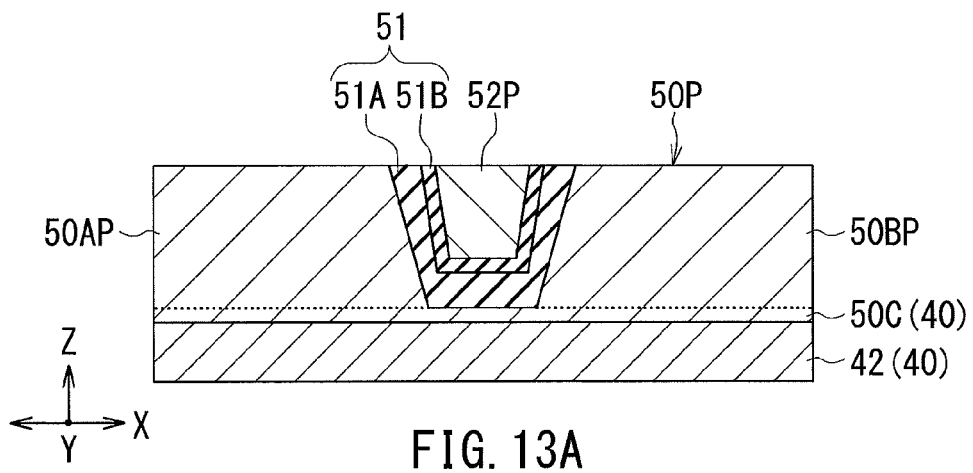
FIGS. 13A to 13C are explanatory diagrams showing a step that follows the step shown in FIGS. 12A to 12C.
Figure 13B:
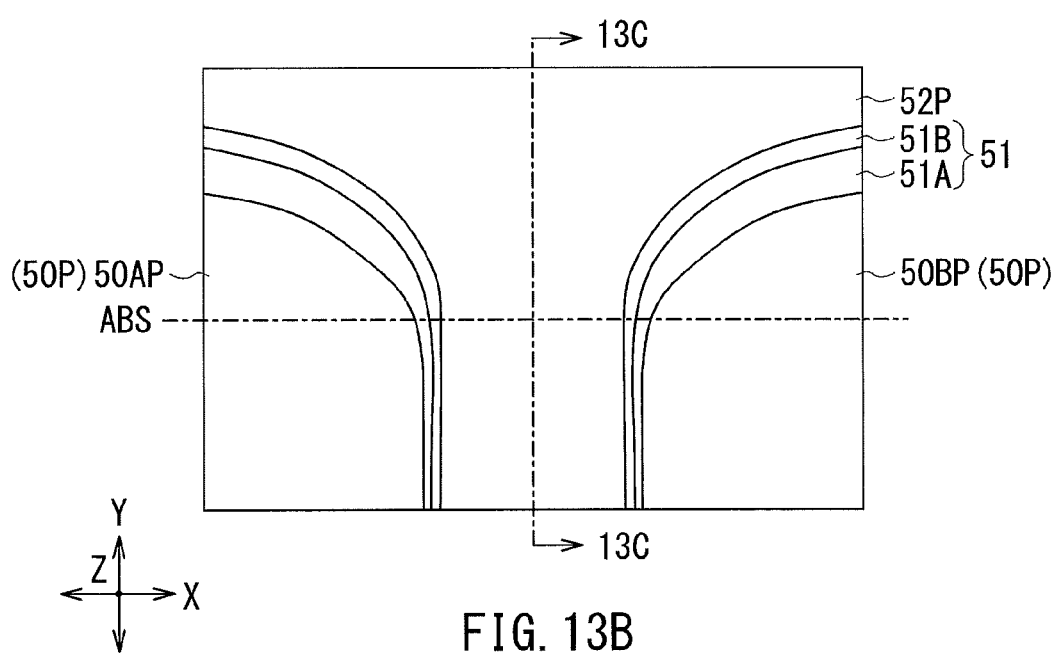
Figure 13C:
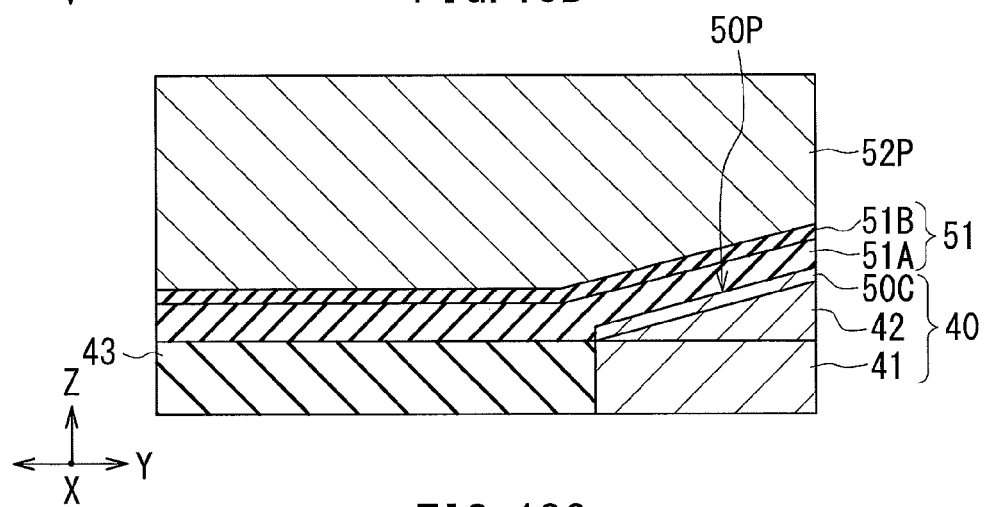

FIGS. 13A to 13C show the next step. In this step, first, an initial main pole 52P, which will later become the main pole 52, is formed on the first gap layer 51 by frame plating, for example. The initial main pole 52P is formed such that its top surface is located at a higher level than the top surfaces of the first and second initial side shields 50AP and 50BP. Next, the nonmagnetic layer 53 is formed over the entire top surface of the stack. The first and second initial side shields 50AP and 50BP, the first gap layer 51, the initial main pole 52P and the nonmagnetic layer 53 are then polished by, for example, CMP, until the top surface of the initial main pole 52P reaches the level of the first flat portion 52T2 of the top surface 52T of the main pole 52 to be formed later.

Now, steps to follow the formation of the initial main pole 52P will be described with reference to FIGS. 4 and 5. First, the nonmagnetic layer 54 is formed on the top surface of the initial main pole 52P. Then, the first and second initial side shields 50AP and 50BP, the first gap layer 51, the initial main pole 52P and the nonmagnetic layers 53 and 54 are taper-etched in part by, for example, ion beam etching, so as to provide the top surface of the initial main pole 52P with the first inclined portion 52T1 and provide the nonmagnetic layer 54 with the end face mentioned previously. A portion of the top surface of the initial main pole 52P that remains after the etching makes the first flat portion 52T2.

Next, the second gap layer 60 is formed over the entire top surface of the stack. The second gap layer 60 is then selectively etched to form therein three openings for exposing the top surfaces of the first and second initial side shields 50AP and 50BP and the initial main pole 52P. Then, the trailing shield 61 is formed on the first and second initial side shields 50AP and 50BP and the second gap layer 60, and the first yoke layer 62 is formed on the initial main pole 52P, by frame plating, for example. Next, the insulating layer 63 is formed to cover the trailing shield 61 and the first yoke layer 62. The insulating layer 63 is then polished by, for example, CMP, until the trailing shield 61 and the first yoke layer 62 are exposed.

Next, the insulating film 64 is formed over the entire top surface of the stack. The coil 65 is then formed on the insulating film 64 by frame plating, for example. Then, the insulating film 66 is formed to cover the coil 65. The insulating films 64 and 66 are then selectively etched to form therein openings for exposing the top surfaces of the trailing shield 61 and the first yoke layer 62. Next, the second yoke layer 67 is formed on the trailing shield 61, the first yoke layer 62 and the insulating film 66 by frame plating, for example.

Next, the protective layer 68 is formed to cover the entire top surface of the stack. Then, wiring, terminals and other components are formed on the protective layer 68, the substrate 10 is cut near the imaginary plane ABS, the cut surface is polished to form the medium facing surface 70, and processing such as fabrication of flying rails is performed to complete the magnetic head. The formation of the medium facing surface 70 makes the first and second initial side shields 50AP and 50BP into the first and second side shields 50A and 50B, respectively, makes the initial magnetic layer 50P into the magnetic layer 50, and makes the initial main pole 52P into the main pole 52.

The operation and effects of the magnetic head according to the embodiment will now be described. To begin with, a first to a third feature relating to the main pole 52 of the magnetic head according to the embodiment and the operation and effects resulting therefrom will be described.

The first feature relating to the main pole 52 is that the end face 52a of the main pole 52 has the top edge ET and the first and second side edges E1 and E2, and the distance between the first and second side edges E1 and E2 in the track width direction decreases with increasing distance from the top edge ET. By virtue of this feature, the embodiment makes it possible to prevent the occurrence of unwanted erasure induced by a skew.

The second feature relating to the main pole 52 is that the top surface 52T of the main pole 52 includes the width-changing portion 52TA that increases in width in the track width direction with increasing distance from the medium facing surface 70. By virtue of this feature, the embodiment allows the main pole 52 to have a large cross-sectional area perpendicular to the direction of flow of magnetic flux at a location apart from the medium facing surface 70 and thereby allows the main pole 52 to guide much magnetic flux to the end face 52a of the main pole 52, while allowing the top edge ET defining the track width to be small in length. As a result, the embodiment is able to achieve an increase in track density and enhancement of writing capability, particularly overwrite property.

The third feature relating to the main pole 52 is that the top surface 52T of the main pole 52 includes the first inclined portion 52T1 while the bottom end 52L of the main pole 52 includes the second inclined portion 52L1. By virtue of this feature, in the vicinity of the medium facing surface 70, the thickness of the main pole 52 in the direction of travel of the recording medium (the Z direction) decreases with decreasing distance to the medium facing surface 70. The embodiment thereby allows the main pole 52 to have a large cross-sectional area perpendicular to the direction of flow of magnetic flux at a location apart from the medium facing surface 70, while allowing the end face 52a of the main pole 52 to have a small length in the direction of travel of the recording medium (the Z direction). Consequently, the embodiment makes it possible to prevent the occurrence of unwanted erasure induced by a skew and achieve enhancement of writing capability, particularly overwrite property.

Now, features relating to the write shield 80 and the gap section 90 of the magnetic head according to the embodiment and the operation and effects resulting therefrom will be described. The write shield 80 includes the trailing shield 61, the leading shield 40, and the first and second side shields 50A and 50B. The gap section 90 includes the trailing gap section 90T, the leading gap section 90L, and the first and second side gap sections 90A and 90B. The provision of the write shield 80 and the gap section 90 in the magnetic head according to the embodiment makes it possible to prevent the occurrence of unwanted erasure induced by a skew, and allows for an increase in recording density.

Further, the magnetic head according to the embodiment has the following first to third features relating to the gap section 90.

The first feature relating to the gap section 90 is that each of the first and second side gap sections 90A and 90B includes the thickness-changing portion that increases in thickness in the track width direction (the X direction) with increasing distance from the medium facing surface 70, and the leading gap section 90L includes the thickness-changing portion 90L1 that increases in thickness in the direction of travel of the recording medium (the Z direction) with increasing distance from the medium facing surface 70. By virtue of this feature, the embodiment allows the distance from the main pole 52 to each of the first and second side shields 50A, 50B and the leading shield 40 to be small in the medium facing surface 70 and increase with increasing distance from the medium facing surface 70. As a result, the embodiment makes it possible to suppress leakage of magnetic flux from the main pole 52 to each of the first and second side shields 50A, 50B and the leading shield 40 at a location away from the medium facing surface 70, and allows flux leakage from the main pole 52 to the outside of the main pole 52 to be concentrated close to the medium facing surface 70. Consequently, the embodiment is able to achieve enhancement of writing capability, particularly overwrite property.

The second feature relating to the gap section 90 is that the thickness LG of the leading gap section 90L in the direction of travel of the recording medium in the medium facing surface 70 is greater than the width SG of each of the first and second side gap sections 90A and 90B in the track width direction at the position in the medium facing surface closest to the trailing gap section 90T. By virtue of this feature, in the embodiment the capability of the leading shield 40 to capture magnetic flux is lower when compared with the case where the thickness LG of the leading gap section 90L is smaller than or equal to the width SG of each of the first and second side gap sections 90A and 90B. Consequently, the embodiment allows the strength of the magnetic field produced from a portion of the end face 52a of the main pole 52 close to the trailing gap section 90T to be higher than the strength of the magnetic field produced from a portion of the end face 52a of the main pole 52 close to the leading gap section 90L. The embodiment thereby makes it possible to increase the write magnetic field strength at the top edge ET of the end face 52a of the main pole 52 or in the vicinity of the top edge ET, and also makes it possible to increase the gradient of change in the write magnetic field strength at the top edge ET or in the vicinity thereof in the distribution of the write magnetic field strength in the direction in which the tracks extend. The embodiment is thus able to achieve enhancement of writing capability. High write magnetic field strength at the top edge ET or in the vicinity thereof contributes particularly to the enhancement of overwrite property. A large gradient of change in the write magnetic field strength at the top edge ET or in the vicinity thereof contributes particularly to the enhancement of linear recording density and the reduction of bit error rate.

The third feature relating to the gap section 90 is that the width SG of each of the first and second side gap sections 90A and 90B in the track width direction in the medium facing surface 70 decreases with decreasing distance to the leading gap section 90L. By virtue of this feature, the embodiment makes it possible to prevent an increase in the width of erase band. This advantageous effect will now be described in detail.

On the record medium, an erase band in which signals are erased is formed on each of opposite sides of a track. The erase-band width tends to become larger when a skew occurs. To increase the track density, it is desirable to reduce the erase-band width. When a skew occurs, however, a portion of the end face 52a of the main pole 52 near the leading gap section 90L, i.e., the portion of the end face 52a adjacent to the bottom edge EL, may protrude from the end of the track to thereby cause magnetic flux to leak from this portion. This may result in an increase in the erase-band width.

In the embodiment, the third feature relating to the gap section 90 makes it possible that the portion of the end face 52a of the main pole 52 near the leading gap section 90L is located closer to the first and second side shields 50A and 50B than is a portion of the end face 52a of the main pole 52 near the trailing gap section 90T, i.e., the portion of the end face 52a adjacent to the top edge ET. Consequently, even if a skew occurs to cause the portion of the end face 52a of the main pole 52 near the leading gap section 90L to protrude from the end of the track, the magnetic flux produced from this portion can be effectively absorbed by the first and second side shields 50A and 50B. As a result, it becomes possible to prevent an increase in the erase-band width induced by a skew.

Making the width SG of each of the first and second side gap sections 90A and 90B be of a fixed small value regardless of distance from the leading gap section 90L results in a small distance from the portion of the end face 52a of the main pole 52 near the trailing gap section 90T to each of the first and second side shields 50A and 50B. In such a case, the magnetic flux produced from the portion of the end face 52a of the main pole 52 near the trailing gap section 90T may be absorbed by the first and second side shields 50A and 50B, and this may result in reductions in the write magnetic field strength and the aforementioned gradient of change in the write magnetic field strength at the top edge ET of the end face 52a of the main pole 52 or in the vicinity of the top edge ET.

According to the embodiment, in contrast, the third feature relating to the gap section 90 allows the portion of the main pole 52 near the trailing gap section 90T to be located at a sufficiently large distance from each of the first and second side shields 50A and 50B. This makes it possible to prevent the reductions in the write magnetic field strength and the aforementioned gradient of change in the write magnetic field strength at the top edge ET of the end face 52a of the main pole 52 or in the vicinity of the top edge ET.

By virtue of the above-described features relating to the main pole 52, the write shield 80 and the gap section 90, the embodiment makes it possible to prevent the occurrence of unwanted erasure while suppressing degradation of writing capability.

In the embodiment, only the second gap layer 60 is interposed between the trailing shield 61 and the first inclined portion 52T1 of the top surface 52T of the main pole 52, whereas the nonmagnetic layer 54 and the second gap layer 60 are interposed between the trailing shield 61 and the first flat portion 52T2 of the top surface 52T of the main pole 52. This also makes it possible for the embodiment to prevent leakage of magnetic flux from the main pole 52 to the trailing shield 61 and thereby achieve enhanced writing cap ability.

[Simulations]

The effects of the embodiment will now be described in more detail with reference to the results of first to third simulations. The first simulation, which relates to write characteristics, will be described first. The first simulation used an example model and a comparative example model described below. The example model is a model fabricated based on an example magnetic head which corresponds to the magnetic head according to the embodiment. In the example magnetic head, the first gap layer 51 was constituted by the first nonmagnetic film 51A and the second nonmagnetic film 51B shown in FIGS. 11A to 13C, the nonmagnetic film 51A was formed by physical vapor deposition, and the second nonmagnetic film 51B was formed by atomic layer deposition.

For the example magnetic head, the first nonmagnetic film 51A was formed under such conditions as to cause the thickness of the film as formed on a flat surface to be 50 nm, and the second nonmagnetic film 51B was formed under such conditions as to cause the thickness of the film as formed on a flat surface to be 20 nm. As a result, the width SG of each of the first and second side gap sections 90A and 90B shown in FIG. 3 decreased with decreasing distance to the leading gap section 90L such that the width SG had the maximum value SGmax at the position closest to the trailing gap section 90T and had the minimum value SGmin at the position closest to the leading gap section 90L. The difference between the maximum value SGmax and the minimum value SGmin was 5 nm. The thickness LG of the leading gap section 90L shown in FIG. 3 was 55 nm.

In the example magnetic head, the leading gap section 90L increased in thickness in the direction of travel of the recording medium (the Z direction) with increasing distance from the medium facing surface 70. As a result, the inclination angle θMP of the second inclined portion 52L1 of the bottom end 52L of the main pole 52 shown in FIG. 2 with respect to the direction perpendicular to the medium facing surface 70 was smaller by 4° than the inclination angle θLS of the third inclined portion 40b of the top surface of the leading shield 40 with respect to the direction perpendicular to the medium facing surface 70.

Further, in the example magnetic head, the thickness of each of the first and second side gap sections 90A and 90B in the track width direction (the X direction) increased with increasing distance from the medium facing surface 70.

The comparative example model is a model fabricated based on a comparative magnetic head in which the first gap layer 51 was formed by atomic layer deposition. In the comparative magnetic head, the first gap layer 51 was formed under such conditions as to cause the thickness of the layer as formed on a flat surface to be 25 nm. As a result, the width SG of each of the first and second side gap sections 90A and 90B shown in FIG. 3 had a constant value regardless of distance from the leading gap section 90L.

In the comparative magnetic head, the thickness of the leading gap section 90L had a constant value regardless of distance from the medium facing surface 70. As a result, the inclination angle θMP of the second inclined portion 52L1 of the bottom end 52L of the main pole 52 shown in FIG. 2 was equal to the inclination angle θLS of the third inclined portion 40b of the top surface of the leading shield 40.

Table 1 lists the values of a plurality of parameters for the example model and the comparative example model. The parameter values listed in Table 1 were selected by simulating the example magnetic head and the comparative magnetic head. As the plurality of parameters for the example model and the comparative example model, Table 1 lists SGmax, SGmin, TG (see FIG. 3), LG, the length PWA of the top edge ET (see FIG. 3), the length PT of the end face 52a of the main pole 52 in the direction of travel of the recording medium (the Z direction), and the length BA of the bottom edge EL (see FIG. 3).

TABLE 1

| Parameter | Example | Comparative example |
|---|---|---|
| SGmax (nm) | 40 | 40 |
| SGmin (nm) | 35 | 40 |
| TG (nm) | 19 | 19 |
| LG (nm) | 55 | 40 |
| θLS (deg) | 22 | 22 |
| θMP (deg) | 18 | 22 |
| PWA (nm) | 60 | 60 |
| PT (nm) | 90 | 90 |
| BA (nm) | 15 | 15 |

Figure 14:
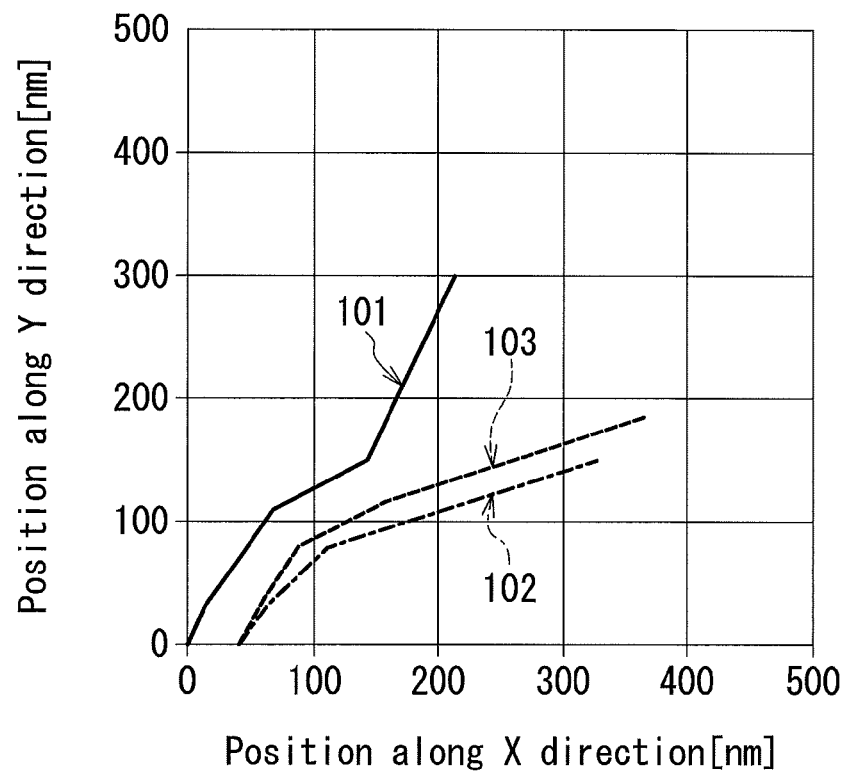
FIG. 14 is an explanatory diagram to illustrate the shapes of main poles and side shields of an example model and a comparative example model.

Reference is now made to FIG. 14 to describe the shapes of the main pole and side shields of each of the the example model and the comparative example model. FIG. 14 illustrates the shape of the edge of the second side surface S2 of the main pole 52 of FIG. 1 farthest from the top surface of the substrate 10, and the shape of the edge of the sidewall SW2 of the second side shield 50B of FIG. 1 farthest from the top surface of the substrate 10. In FIG. 14, the positions of arbitrary points on the aforementioned two edges along the X direction and the Y direction are indicated. In FIG. 14 the horizontal axis represents position along the X direction or the track width direction, and the vertical axis represents position along the Y direction or the direction perpendicular to the medium facing surface 70. In FIG. 14 the point of intersection of the aforementioned edge of the second side surface S2 and the top edge ET is the origin point.

In FIG. 14, the solid line labeled 101 represents a portion of the aforementioned edge of the second side surface S2 of the main pole 52 of each of the example model and the comparative example model. The dot-and-dash line labeled 102 represents a portion of the aforementioned edge of the sidewall SW2 of the second side shield 50B of the example model. The broken line labeled 103 represents a portion of the aforementioned edge of the sidewall SW2 of the second side shield 50B of the comparative example model. The shapes of the main pole 52 and the second side shield 50B of the example model reflect the shapes of the main pole 52 and the second side shield 50B of the example magnetic head. The main pole 52 of the comparative example model has the same shape as that of the example model. The shape of the second side shield 50B of the comparative example model was determined with the sidewall SW2 of the second side shield 50B positioned at a constant distance from the second side surface S2 of the main pole 52.

Although not illustrated, the main pole 52 of each of the example model and the comparative example model is shaped to be symmetrical with respect to a cross section that passes through the center in the track width direction (the X direction) of the end face 52a of the main pole 52 and that is perpendicular to the medium facing surface 70 and to the top surface of the substrate 10. Such a cross section will hereinafter be referred to as the main cross section. The first side shield 50A of the example model is shaped to be symmetrical to the second side shield 50B of the example model with respect to the main cross section. Likewise, the first side shield 50A of the comparative example model is shaped to be symmetrical to the second side shield 50B of the comparative example model with respect to the main cross section. The example model and the comparative example model are otherwise configured in the same manner as the magnetic head according to the embodiment.

The example model satisfies the first to third features relating to the main pole 52 and the first to third features relating to the gap section 90 described previously. In contrast, the comparative example model does not satisfy the first to third features relating to the gap section 90 while satisfying the first to third features relating to the main pole 52.

The first simulation determined the distribution of the write magnetic field strength in the direction of extension of tracks for each of the example model and the comparative example model. The first simulation then determined the maximum value Hmax of a component $H_y$ of the write magnetic field in a direction perpendicular to the magnetic recording layer (the Y direction), and the gradient Hgrad of a change in $H_y$ with respect to a positional change along the direction of extension of tracks at a position at which $H_y$ is 5 kOe (1 Oe=79.6 A/m), the position being located on the trailing side relative to the position at which $H_y$ takes on the maximum value Hmax. In the first simulation, the supply current to the coil 65 (see FIG. 4) was 30 mA. Table 2 shows the results of the first simulation.

TABLE 2

|  | Example | Comparative example |
|---|---|---|
| Hmax (Oe) | 7190 | 6940 |
| Hgrad (Oe/nm) | 224 | 209 |

As shown in Table 2, in the example model, Hmax and Hgrad are both larger than those in the comparative example model. This is because the example model benefits from the above-described effects of the first and second features relating to the gap section 90. A large Hmax contributes particularly to the enhancement of overwrite property, and a large Hgrad contributes particularly to the reduction of bit error rate.

The second simulation, which relates to unwanted erasure, will now be described. The second simulation investigated the distribution of the effective write magnetic field $H_{eff}$ in the track width direction for each of the example model and the comparative example model used in the first simulation. In the second simulation, the supply current to the coil 65 (see FIG. 4) was 150 mA. The effective write magnetic field $H_{eff}$ represents the magnitude of the magnetic field that effectively acts on the magnetic recording layer of the recording medium so as to form record bits by inverting the magnetization of the magnetic recording layer. The effective write magnetic field $H_{eff}$ is calculated as described below on the basis of the write magnetic field produced from the main pole 52. Specifically, the effective write magnetic field $H_{eff}$ is expressed by the following equation using $H_y$, $H_T$, and $H_L$, where $H_y$ represents a component of the write magnetic field in the direction perpendicular to the magnetic recording layer (the Y direction), $H_T$ represents a component of the write magnetic field in the track width direction (the X direction), and HL represents a component of the write magnetic field in the direction of extension of tracks (the Z direction).

$$H_{eff} = \{(H_L^2 + H_T^2)^{1/3} + H_y^{2/3}\}^{3/2}$$

Figure 15:
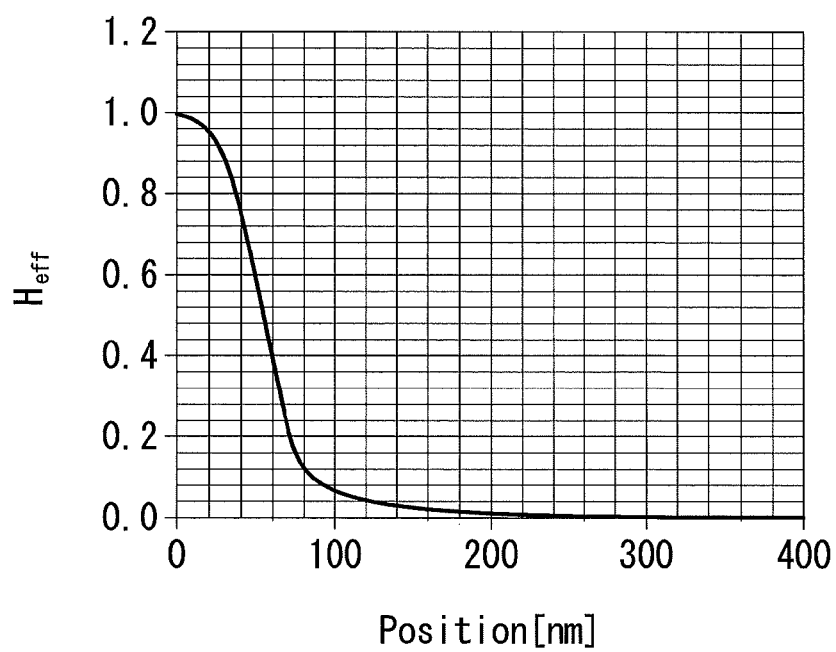
FIG. 15 is a characteristic diagram showing the relationship between the position along the track width direction and the effective write magnetic field in the example model and the comparative example model.

FIG. 15 shows the results of the second simulation. In FIG. 15, the horizontal axis represents position along the track width direction (the X direction) in the medium facing surface 70, while the vertical axis represents the effective write magnetic field $H_{eff}$. On the horizontal axis of FIG. 15, the center position of the end face 52a of the main pole 52 in the track width direction is taken as 0 µm for each of the example model and the comparative example model. In FIG. 15, the effective write magnetic field $H_{eff}$ is normalized so that its maximum value is 1. There is almost no difference between the example model and the comparative example model in the distribution of the effective write magnetic field $H_{eff}$. Accordingly, the distribution of the effective write magnetic field $H_{eff}$ in the example model and that in the comparative example model are plotted by a single solid line in FIG. 15. Table 3 lists specific values of the effective write magnetic field $H_{eff}$ at three positions for each of the example model and the comparative example model. The values of the effective write magnetic field $H_{eff}$ in Table 3 are normalized ones as in FIG. 15.

TABLE 3

| Position (nm) | Example | Comparative example |
|---|---|---|
| 20 | 0.960 | 0.962 |
| 50 | 0.601 | 0.593 |
| 100 | 0.072 | 0.070 |

As described above, there is almost no difference between the example model and the comparative example model in the distribution of the effective write magnetic field $H_{eff}$ in the track width direction. This indicates that the example model and the comparative example model have equivalent capability in suppression of unwanted erasure. On the other hand, Table 2 shows that both Hmax and Hgrad are larger in the example model than in the comparative example model, indicating that the writing capability is enhanced in the example model.

Generally, enhancing the writing capability increases the magnitude of the magnetic field acting on tracks other than a track targeted for writing, thus making it easier for unwanted erasure to occur. Contrary to this, in the example model, the writing capability is enhanced while the capability of suppressing unwanted erasure remains equivalent when compared with the comparative example model, as described above. This indicates that the magnetic head according to the embodiment is able to provide enhanced writing capability and prevent the occurrence of unwanted erasure.

The third simulation, which relates to the third feature relating to the gap section 90, will now be described. The third simulation investigated a preferred range of SGmin/SGmax, i.e., the ratio of the minimum value SGmin to the maximum value SGmax of the width SG of each of the side gap sections 90A and 90B. The third simulation used first to fourth models described below, and the comparative example model used in the first simulation. The first to fourth models are four models based on the example model used in the first simulation, being different only in the minimum value SGmin. The minimum value SGmin is 25 nm in the first model, 30 nm in the second model, 35 nm in the third model, and 40 nm in the fourth model. All the parameter values of the first to fourth models except the minimum value SGmin are identical to those of the example model used in the first simulation.

In the third simulation, Hmax and Hgrad defined in the first simulation were determined for each of the first to fourth models and the comparative example model with the supply current to the coil 65 (see FIG. 4) set to 30 mA. In the third simulation, the effective write magnetic field $H_{eff}$ at the center position in the track width direction of a track adjacent to the track targeted for writing was further determined for each of the first to fourth models and the comparative example model under the condition that the track pitch was 40 nm and the supply current to the coil 65 was 150 mA. Hereinafter, a track adjacent to the track targeted for writing will be referred to as an adjacent track. The effective write magnetic field $H_{eff}$ at the center position in the track width direction of the adjacent track will be referred to as adjacent track erasure field and denoted by the symbol ATEH.

Table 4 shows the results of the third simulation. Model 1, Model 2, Model 3, and Model 4 in Table 4 represent the first model, the second model, the third model, and the fourth model, respectively.

TABLE 4

|  | Model 1 | Model 2 | Model 3 | Model 4 | Comparative example |
|---|---|---|---|---|---|
| SGmin (nm) | 25 | 30 | 35 | 40 | 40 |
| SGmin/SGmax (%) | 63 | 75 | 88 | 100 | 100 |
| Hmax (Oe) | 6578 | 6797 | 6921 | 7047 | 6800 |
| Hgrad (Oe/nm) | 185 | 203 | 209 | 216 | 203 |
| ATEH (Oe) | 6621 | 6610 | 6702 | 6757 | 6703 |

Figure 16:
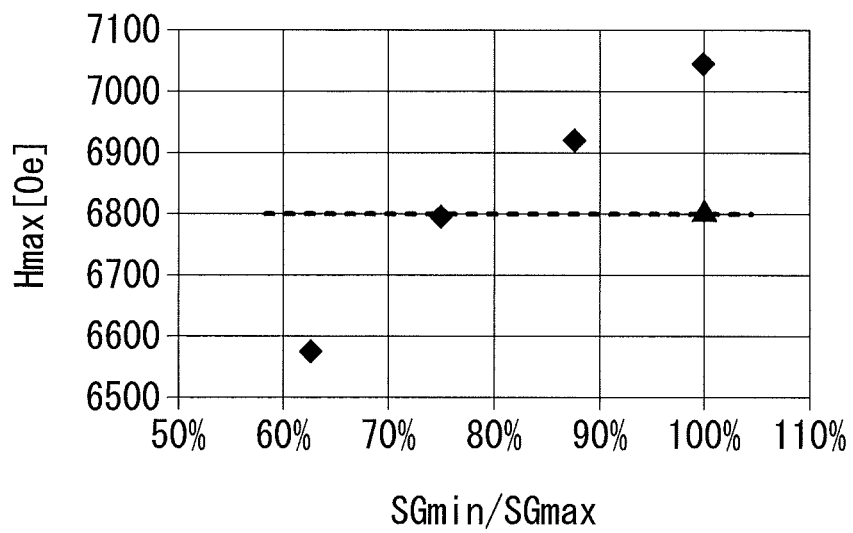
FIG. 16 is a characteristic diagram showing the relationship between the ratio of the minimum value to the maximum value of the width of each of the first and second side gap sections and the write magnetic field strength.
Figure 17:
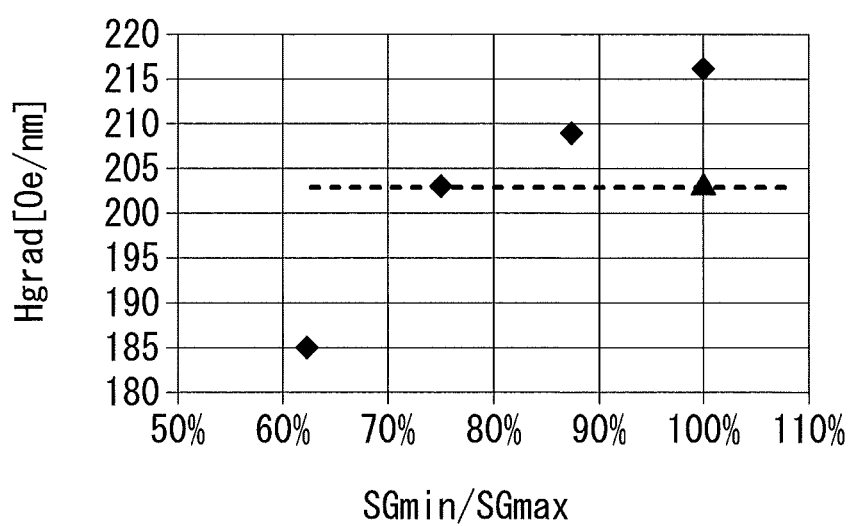
FIG. 17 is a characteristic diagram showing the relationship between the ratio of the minimum value to the maximum value of the width of each of the first and second side gap sections and the gradient of change of the write magnetic field strength.
Figure 18:
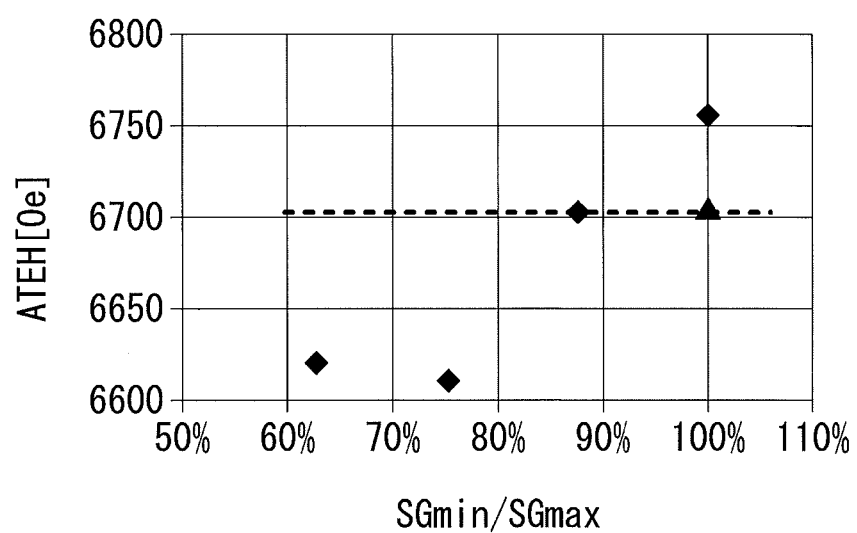
FIG. 18 is a characteristic diagram showing the relationship between the ratio of the minimum value to the maximum value of the width of each of the first and second side gap sections and the effective write magnetic field at an adjacent track.

The results of the third simulation are also shown in FIGS. 16 to 18. In each of FIGS. 16 to 18, the horizontal axis represents the ratio SGmin/SGmax. The vertical axes in FIGS. 16, 17 and 18 represent Hmax, Hgrad and ATEH, respectively. Triangular points in FIGS. 16 to 18 indicate the simulation results for the comparative example model. Broken lines in FIGS. 16, 17, and 18 intersecting the respective triangular points indicate Hmax, Hgrad, and ATEH, respectively, of the comparative example model. Four square points in each of FIGS. 16 to 18 indicate the respective simulation results for the first to fourth models.

Table 4 and FIGS. 16 and 17 show that in the first to fourth models, Hmax and Hgrad increase as the ratio SGmin/SGmax increases. It can be seen from FIGS. 16 and 17 that under the condition in which all the parameter values except the ratio SGmin/SGmax are identical to those of the example model used in the first simulation, Hmax and Hgrad larger than those of the comparative example model are obtained when the ratio SGmin/SGmax is higher than 75%. This indicates that the minimum value SGmin of the width SG is preferably larger than 75% of the maximum value SGmax of the width SG.

Further, Table 4 and FIG. 18 show that under the condition in which all the parameter values except the ratio SGmin/SGmax are identical to those of the example model used in the first simulation, the adjacent track erasure field ATEH becomes larger than that of the comparative example model when the ratio SGmin/SGmax becomes higher than 90%. It is thus preferred that the minimum value SGmin of the width SG be smaller than 90% of the maximum value SGmax of the width SG.

The present invention is not limited to the foregoing embodiment, and various modifications may be made thereto. For example, as far as the requirements of the appended claims are met, the main pole 52, the write shield 80 and the gap section 90 may be shaped and located as desired, and need not necessarily be as in the respective examples illustrated in the foregoing embodiment.

For example, the top surface 52T of the main pole 52 may include a constant width portion located between the width-changing portion 52TA and the medium facing surface 70 and having a constant width in the track width direction (the X direction) regardless of distance from the medium facing surface 70. In such a case, the width of the constant width portion is smaller than or equal to the minimum width of the width-changing portion 52TA.

The first side gap section 90A may include a constant thickness portion located between the thickness-changing portion 90A1 and the medium facing surface 70 and having a constant thickness in the track width direction (the X direction) regardless of distance from the medium facing surface 70. In such a case, the thickness of the constant thickness portion of the first side gap section 90A is smaller than or equal to the minimum thickness of the thickness-changing portion 90A1.

Likewise, the second side gap section 90B may include a constant thickness portion located between the thickness-changing portion 90B1 and the medium facing surface 70 and having a constant thickness in the track width direction (the X direction) regardless of distance from the medium facing surface 70. In such a case, the thickness of the constant thickness portion of the second side gap section 90B is smaller than or equal to the minimum thickness of the thickness-changing portion 90B1.

The leading gap section 90L may include a constant thickness portion located between the thickness-changing portion 90L1 and the medium facing surface 70 and having a constant thickness in the direction of travel of the recording medium (the Z direction) regardless of distance from the medium facing surface 70. In such a case, the thickness of the constant thickness portion of the leading gap section 90L is smaller than or equal to the minimum thickness of the thickness-changing portion 90L1.

Obviously, many modifications and variations of the present invention are possible in the light of the above teachings. Thus, it is to be understood that, within the scope of the appended claims and equivalents thereof, the invention may be practiced in other than the foregoing most preferable embodiment.

What is claimed is:

1. A magnetic head for perpendicular magnetic recording, comprising:
   a medium facing surface configured to face a recording medium;
   a coil for producing a magnetic field corresponding to data to be written on the recording medium;
   a main pole for passing a magnetic flux corresponding to the magnetic field produced by the coil, and for producing a write magnetic field for use to write the data on the recording medium by means of a perpendicular magnetic recording system;
   a write shield formed of a magnetic material; and
   a gap section formed of a nonmagnetic material and provided between the main pole and the write shield, wherein
   the main pole has: an end face located in the medium facing surface; a top surface located at a front-side end of the main pole in a direction of travel of the recording medium; a bottom end opposite to the top surface; and a first side surface and a second side surface located at opposite ends of the main pole in a track width direction,
   the end face of the main pole has a top edge located at an end of the top surface of the main pole, and a first side edge and a second side edge located at respective ends of the first side surface and the second side surface of the main pole,
   a distance between the first side edge and the second side edge in the track width direction decreases with increasing distance from the top edge, the top surface of the main pole includes a width-changing portion that increases in width in the track width direction with increasing distance from the medium facing surface, the write shield includes a trailing shield located on a front side in the direction of travel of the recording medium relative to the main pole, a leading shield located on a rear side in the direction of travel of the recording medium relative to the main pole, and a first side shield and a second side shield located on opposite sides of the main pole in the track width direction, the trailing shield has a trailing shield end face located in the medium facing surface at a position on the front side in the direction of travel of the recording medium relative to the end face of the main pole, the leading shield has a leading shield end face located in the medium facing surface at a position on the rear side in the direction of travel of the recording medium relative to the end face of the main pole, the first side shield and the second side shield respectively have a first side shield end face and a second side shield end face located in the medium facing surface at positions on opposite sides of the end face of the main pole in the track width direction, the gap section includes a trailing gap section for separating the trailing shield from the top surface of the main pole, a leading gap section for separating the leading shield from the bottom end of the main pole, and a first side gap section and a second side gap section for separating the first side shield and the second side shield from the first side surface and the second side surface of the main pole, respectively, each of the first and second side gap sections includes a thickness-changing portion that increases in thickness in the track width direction with increasing distance from the medium facing surface, the thickness-changing portion of each of the first and second side gap sections has an end located in the medium facing surface, and starts the increase in thickness in the track width direction at the end located in the medium facing surface, the leading gap section includes a thickness-changing portion that increases in thickness in the direction of travel of the recording medium with increasing distance from the medium facing surface, the thickness-changing portion of the leading gap section has an end located in the medium facing surface, and starts the increase in thickness in the direction of travel of the recording medium at the end located in the medium facing surface, a thickness of the leading gap section in the direction of travel of the recording medium in the medium facing surface is greater than a width of each of the first and second side gap sections in the track width direction at a position in the medium facing surface closest to the trailing gap section, and the width of each of the first and second side gap sections in the track width direction in the medium facing surface decreases with decreasing distance to the leading gap section.

2. The magnetic head for perpendicular magnetic recording according to claim 1, wherein the width of each of the first and second side gap sections in the track width direction in the medium facing surface has a maximum value and a minimum value, the minimum value being larger than 75% of the maximum value.

3. The magnetic head for perpendicular magnetic recording according to claim 2, wherein the minimum value is smaller than or equal to 90% of the maximum value.

4. The magnetic head for perpendicular magnetic recording according to claim 1, further comprising a return path section formed of a magnetic material, wherein
the return path section connects the write shield and a portion of the main pole located away from the medium facing surface to each other so that a space is defined by the main pole, the gap section, the write shield and the return path section, and
the coil includes a portion passing through the space.

5. A head assembly comprising a slider, and a supporter for flexibly supporting the slider, the slider including the magnetic head according to claim 1 and being disposed to face the recording medium.

6. A magnetic recording device comprising the magnetic head according to claim 1, the recording medium, and a positioning device for supporting the magnetic head and positioning the magnetic head with respect to the recording medium.

* * * * *